United States Patent
Sano et al.

(10) Patent No.: US 10,197,403 B2
(45) Date of Patent: Feb. 5, 2019

(54) ELECTRONIC DEVICE

(71) Applicant: FUJITSU TEN LIMITED, Kobe-shi, Hyogo (JP)

(72) Inventors: Tetsuo Sano, Kobe (JP); Takahiro Jo, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 0 days.

(21) Appl. No.: 15/027,324

(22) PCT Filed: Feb. 19, 2015

(86) PCT No.: PCT/JP2015/054611
§ 371 (c)(1),
(2) Date: Apr. 5, 2016

(87) PCT Pub. No.: WO2015/151630
PCT Pub. Date: Oct. 8, 2015

(65) Prior Publication Data
US 2016/0252357 A1 Sep. 1, 2016

(30) Foreign Application Priority Data
Mar. 31, 2014 (JP) .................. 2014-071217

(51) Int. Cl.
*G01C 21/26* (2006.01)
*B60K 37/02* (2006.01)

(52) U.S. Cl.
CPC ............ *G01C 21/265* (2013.01); *B60K 37/02* (2013.01)

(58) Field of Classification Search
CPC .. B60K 35/00; B60K 2350/941; B60K 37/02; B60K 2350/405; G01C 21/3688; G01C 21/265; G06F 1/1616; G06F 1/1677
USPC ..................................... 361/679.05
See application file for complete search history.

(56) References Cited

U.S. PATENT DOCUMENTS

| | | | |
|---|---|---|---|
| 2002/0005897 A1 | 1/2002 | Kim | |
| 2005/0134208 A1 | 6/2005 | Shike et al. | |
| 2005/0183981 A1* | 8/2005 | Gelardi | B65D 83/0463 206/531 |

(Continued)

FOREIGN PATENT DOCUMENTS

| | | |
|---|---|---|
| CN | 1604728 A | 4/2005 |
| JP | 2005-116620 A | 4/2005 |
| JP | 2009-166668 A | 7/2009 |

(Continued)

OTHER PUBLICATIONS

May 19, 2015 Written Opinion issued in International Patent Application No. PCT/JP2015/054611.

(Continued)

*Primary Examiner* — Anthony Haughton
*Assistant Examiner* — Ingrid Wright
(74) *Attorney, Agent, or Firm* — Oliff PLC; James A. Oliff; Jay A. Stelacone

(57) ABSTRACT

A display panel can transition between an inclined state and a fixed state, via an upper end contact state, in accordance with linear reciprocal movement relative to a base chassis of a main slider. In the upper end contact state, the upper end of the display panel is in contact with the front surface of the base chassis and the lower end of the display panel is separated from the front surface of the base chassis.

3 Claims, 20 Drawing Sheets

(56) References Cited

U.S. PATENT DOCUMENTS

2009/0257205 A1    10/2009    Itoh et al.

FOREIGN PATENT DOCUMENTS

| JP | 2009-248933 A | 10/2009 |
| JP | 2010-174506 A | 8/2010 |
| JP | 2010-184506 A | 8/2010 |
| KR | 2000-0033789 A | 6/2000 |
| WO | 00/30896 A1 | 6/2000 |

OTHER PUBLICATIONS

May 19, 2015 International Search Report issued in International Patent Application No. PCT/JP2015/054611.
Nov. 16, 2017 Extended European Search Report issued in European Patent Application No. 15772377.6.

* cited by examiner

ELECTRONIC DEVICE

TECHNICAL FIELD

The present invention relates to an electronic device including a main body having a fixing surface and a display unit capable of taking an inclined posture relative to the fixing surface.

BACKGROUND ART

As a kind of the electronic device, a navigation device that is to be mounted on a vehicle or the like has been known. The navigation device includes a main body having a fixing surface in which a medium insertion opening is formed and a display unit having a display surface for displaying information. The display unit can take a fixed state in which the display unit is fixed to the fixing surface and an inclined state in which the display unit takes an inclined posture relative to the fixing surface. When the display unit is in the inclined state, the medium insertion opening is exposed, so that a medium can be inserted or discharged. When the display unit is in the fixed state, the medium insertion opening is covered by the display unit. When the display unit is in the fixed state, the display unit takes a posture parallel with the fixing surface. A transition operation of the display unit from the fixed state to the inclined state is also referred to as a tilt operation.

Patent Literature 1 discloses a mechanism configured to enable the tilt operation. When performing the tilt operation by the mechanism, the display unit first moves forwards with keeping the posture parallel with the fixing surface. Then, the display unit takes an inclined posture relative to the fixing surface.

CITATION LIST

Patent Literature

Patent Literature 1: JP-A-2010-174506

SUMMARY OF INVENTION

Technical Problem

However, the posture of the display unit may be non-parallel with the fixing surface of the main body due to aging deterioration or slight design error of the mechanism configured to drive the display unit. In this case, when the display unit transitions to the fixed state, a gap is generated between the display unit and the fixing surface, so that an abnormal or rattling sound may be caused. In particular, when the mechanism configured to drive the display unit is connected to a lower end of the display unit, if an upper end of the display unit is inclined in a direction of separating from the fixing surface (i.e., a reverse tilt state), a force of the driving mechanism is not transmitted to the upper end of the display unit, so that a large gap is likely to be generated. That is, it is not possible to rigidly fix the display unit to the main body.

It is therefore an object of the present invention to prevent a reverse tilt state of a display unit and to rigidly fix the display unit to a main body.

Solution to Problem

In order to achieve the above object, according to an aspect of the present invention, there is provided an electronic device. The electronic device includes:

a main body fixed to a fixing target and having a fixing surface, a display unit having a display surface for displaying information, and a first movement part connected to a lower end of the display unit and configured to linearly reciprocally move relative to the main body.

The display unit can transition between an inclined state and a fixed state via an upper end contact state in accordance with the reciprocal movement of the first movement part.

In the inclined state, the display unit is spaced from the fixing surface and the display surface faces upwards obliquely.

In the upper end contact state, an upper end of the display unit is in contact with the fixing surface and the lower end of the display unit is spaced from the fixing surface.

In the fixed state, the upper end and the lower end of the display unit are in contact with the fixing surface.

According to the above configuration, when fixing the display unit to the main body, the upper end of the display unit is contacted to the fixing surface and then the lower end of the display unit connected to the first movement part is contacted to the fixing surface. For this reason, it is possible to prevent a reverse tilt state of the display unit and to rigidly fix the display unit to the main body.

The electronic device can be configured as follows.

The electronic device includes:

a second movement part configured to reciprocally move in parallel with the first movement part, a support part configured to support the display unit, a first connection part to which the lower end of the display unit is to be connected to be rotatable relative to the first movement part, and a second connection part provided between the upper end and the lower end of the display unit and to which the display unit and the support part are to be connected to be relatively rotatable.

In the upper end contact state, the first connection part is positioned more distant from the fixing surface than the second connection part.

According to the above configuration, it is possible to prevent the reverse tilt state of the display unit more securely and to rigidly fix the display unit to the main body.

In this case, the electronic device can be configured as follows.

The electronic device has a pressing part configured to press downwards the second movement part at least in the fixed state.

According to the above configuration, bending of the second movement part, which is caused due to the support part's stress of pulling up the second movement part at least in the fixed state, is suppressed. Thereby, a change in state of the display unit is smoothly made. Therefore, it is possible to prevent the reverse tilt state of the display unit more securely and to rigidly fix the display unit to the main body.

DESCRIPTION OF EMBODIMENTS

Hereinafter, illustrative embodiments will be described in detail with reference to the accompanying drawings.

1. First Illustrative Embodiment

<1-1. Outline>

Figure 1:
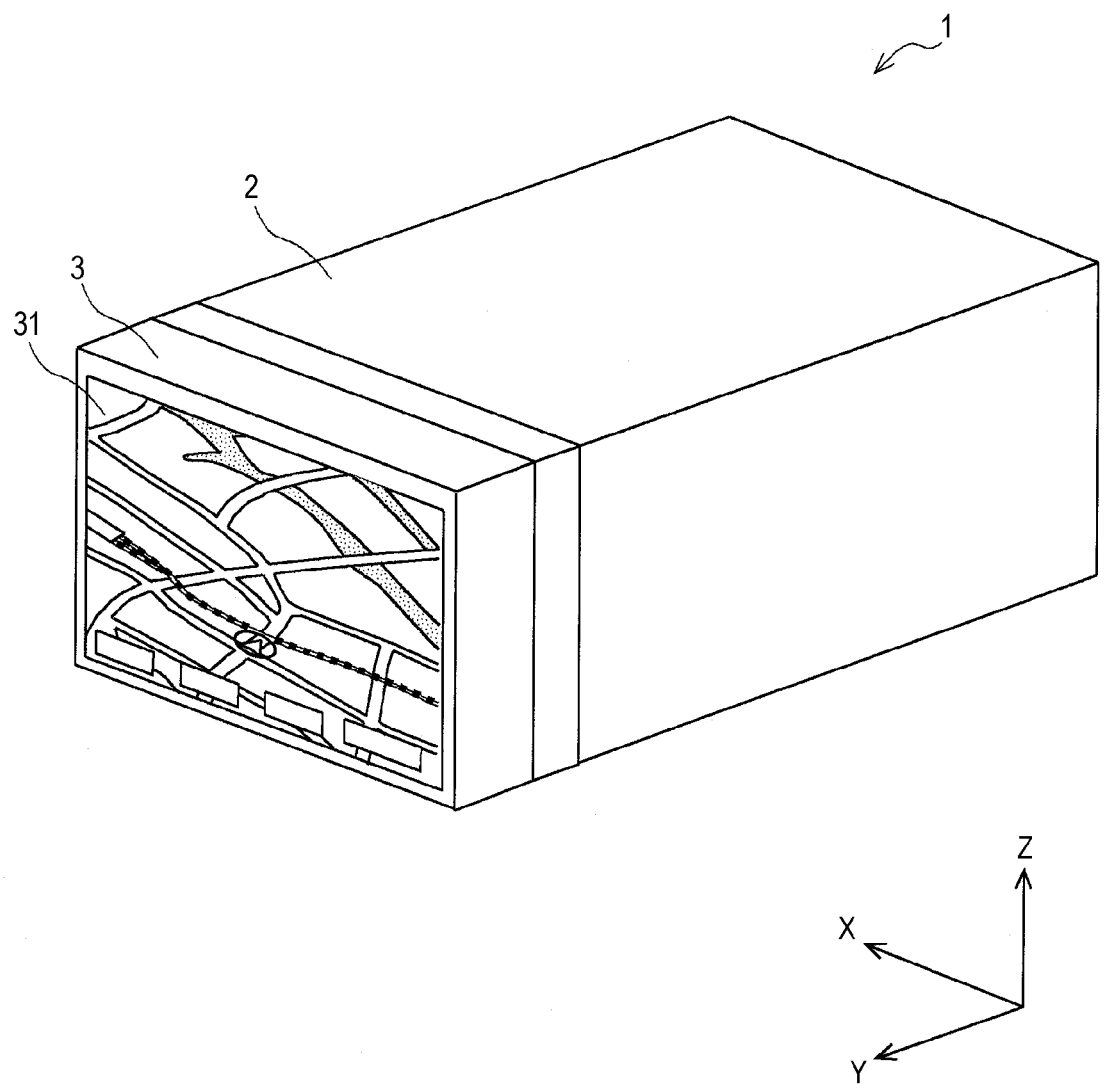
FIG. 1 is a perspective view depicting an outward appearance of an electronic device according to a first illustrative embodiment.

FIG. 1 is a perspective view depicting an outward appearance of an electronic device 1 according to a first illustrative embodiment. The electronic device 1 is a device that is to be mounted on a vehicle such as an automobile and is to be used in a vehicle interior. The electronic device 1 has a navigation function of guiding a route to a destination and an audio function of outputting voice into the vehicle interior.

The electronic device 1 has a basis chassis 2 and a display panel 3 configured to display a variety of information.

In below description, a three dimensional Cartesian coordinate system (XYZ) shown in each drawing is used. The Cartesian coordinate system is relatively fixed to the basis chassis 2 and indicates directions. An X-axis direction is a left-right direction, a Y-axis direction is a front-back direction, and a Z-axis direction is an upper-lower direction. A +X-side is a left side of a display surface of the display panel 3, and a −X-side is a right side of the display surface. A +Y-side is a front side of the display surface, and a −Y-side is a backside of the display surface. A +Z-side is an upper side and a −Z-side is a lower side.

The basis chassis 2 is fixed in a dashboard (i.e., a vehicle), which is a fixing target, by a fastener. The basis chassis 2 is a box-shaped housing. The basis chassis 2 functions as a main body of the electronic device 1. In the first illustrative embodiment, the basis chassis 2 is fixed so that a bottom surface thereof extends along a substantially horizontal direction. Therefore, the X-axis direction and the Y-axis direction run in the substantially horizontal direction, and the Z-axis direction runs in a substantially vertical direction. The basis chassis 2 has an insertion opening for diverse media such as a CD, a DVD and the like.

The display panel 3 has a display 31 (an example of the display surface) such as a liquid crystal monitor. The display panel 3 functions as the display unit of the electronic device 1. The display surface of the display panel 3 has a substantially rectangular shape having a longitudinal direction and a width direction. A user (mainly, a driver) getting in the vehicle obtains a variety of information by visibly recognizing the display 31 of the display panel 3.

The display 31 has a touch panel. The display 31 is configured to receive a user's operation input. The user can input a variety of instructions into the electronic device 1 by touching command buttons displayed on the display 31.

Figure 2:
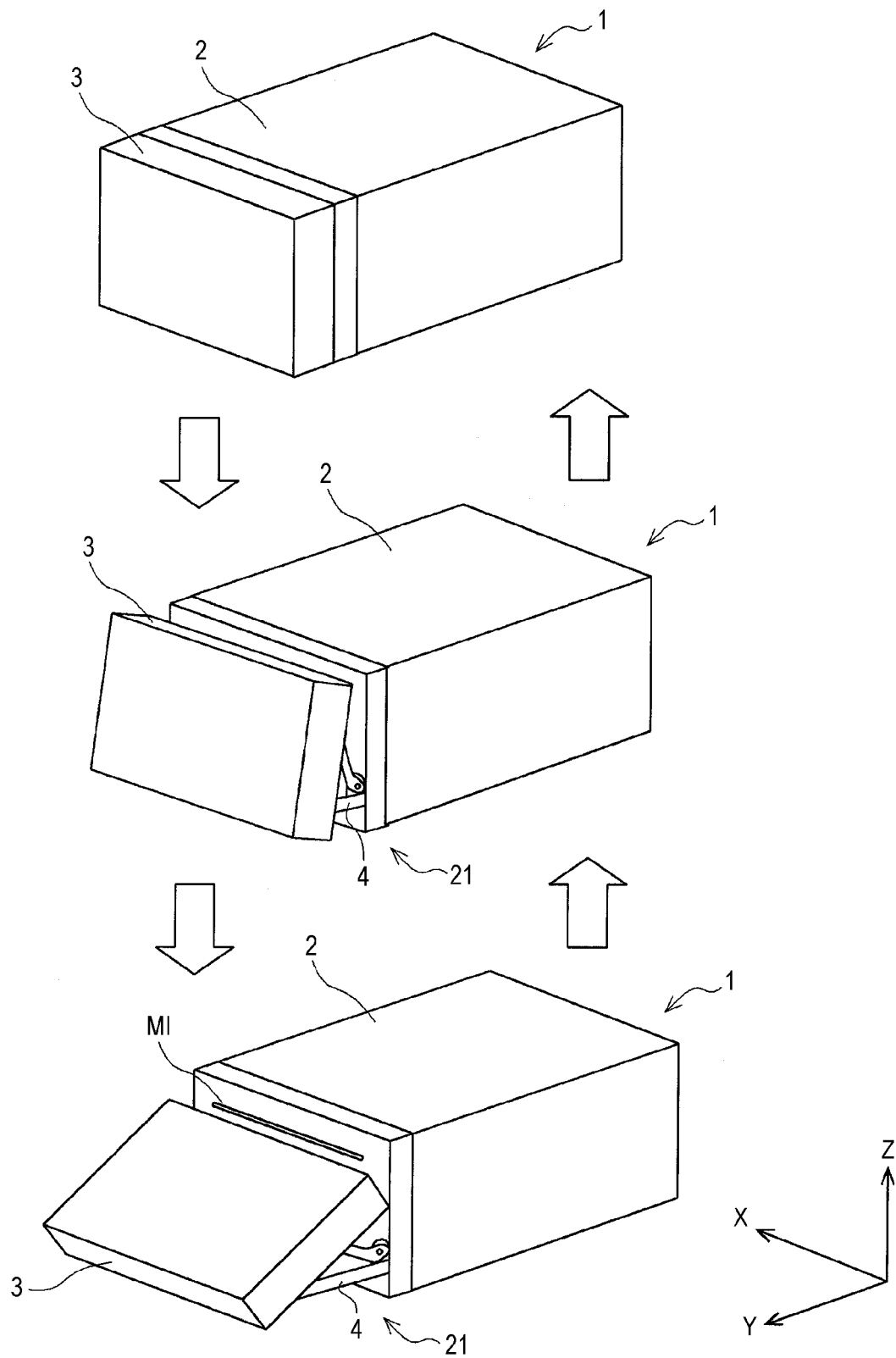
FIG. 2 depicts movement of a display panel of the electronic device.

FIG. 2 depicts movement of the display panel 3. The display panel 3 is configured to change a direction of the display surface by an operation of a tilt mechanism 21. The tilt mechanism 21 is configured to incline (tilt) the display panel 3 about a rotary shaft extending in the left-right direction (the X-axis direction) by moving a main slider 4 connected to a lower end-side (the −Z-side) of the display panel 3 in the front-back direction (the Y-axis direction). When the display panel 3 is tilted, an inside of the basis chassis 2 is exposed, so that the medium insertion opening MI (refer to a lower view) for a CD, a DVD or the like appears.

The tilt mechanism 21 is configured to transition from a state (a completely closed state; refer to an upper view) where the medium insertion opening is covered to a state (a completely opened state; refer to a lower view) where the medium insertion opening MI is exposed via a state (a half-opened state; refer to a middle view) where the medium insertion opening is half-covered by tilting the direction of the display surface of the display panel 3. The completely closed state where the medium insertion opening is covered by the display panel 3 is also a fixed state where the display panel 3 is fixed to the basis chassis 2. The fixed state indicates a state where a backside (an opposite side to the display surface) of the display panel 3 is in contact with a front surface 27 (a surface having the medium insertion opening; an example of the fixing surface; see FIG. 5) of the basis chassis 2. For example, the fixed state means a state where the medium insertion opening is covered by the display panel 3.

When the tilt mechanism 21 moves the main slider 4 into the basis chassis 2 to bring the display panel 3 into contact with the basis chassis 2, the display panel 3 becomes in the completely closed state where the display panel is fixed to the basis chassis 2.

However, a state (a so-called reverse tilt state) may occur in which even when the lower end of the display panel 3 is contacted to the basis chassis 2, the upper end of the display panel 3 is not contacted to the basis chassis 2 due to aging deterioration resulting from repeating driving of the tilt mechanism 21 or a slight design error thereof. When the reverse tilt state occurs, even though the lower end of the display panel 3 is contacted to the basis chassis 2, the upper end of the display panel 3 is not contacted to the basis chassis 2. The reason is that the upper end of the display panel 3 is not connected with the main slider 4 and a force of fixing the upper end to the basis chassis 2 is difficult to be transmitted. For this reason, when the display panel 3 becomes in the reverse tilt state, a gap is generated between the upper end of the display panel 3 and the basis chassis 2, so that an abnormal or rattling sound is caused in the display panel 3.

Figure 3:
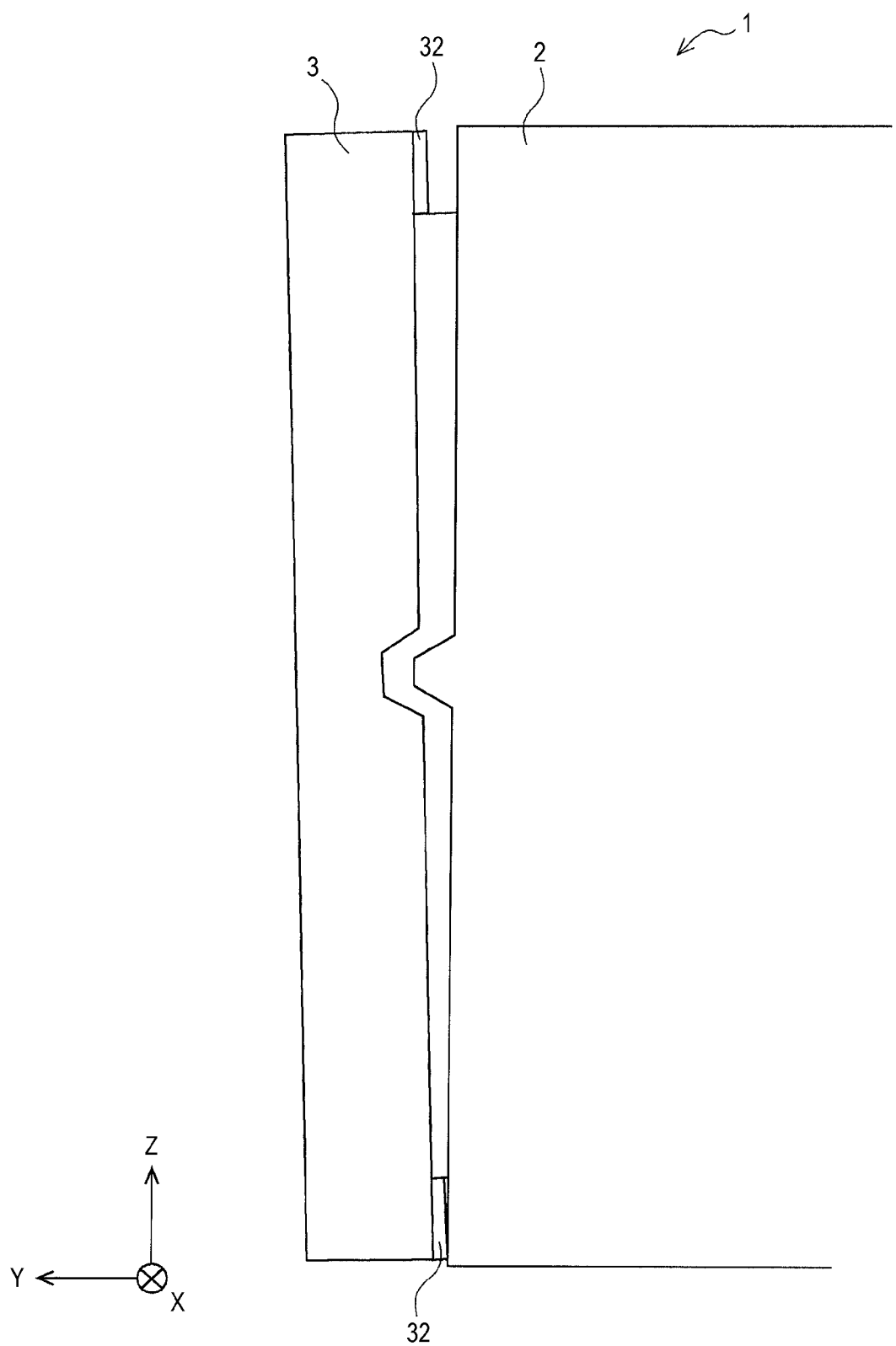
FIG. 3 depicts a reverse tilt state of the display panel.

FIG. 3 depicts the reverse tilt state of the display panel 3. Since the lower end of the display panel 3 is pulled towards the basis chassis 2 (the −Y direction) by the main slider 4, it is contacted to the basis chassis 2. However, the upper end of the display panel 3 is bent in a direction (the +Y direction) of separating from the basis chassis 2 due to the aging deterioration or the like, so that it is not contacted to the basis chassis 2. The upper end of the display panel 3 vibrates as the vehicle vibrates, for example, so that an abnormal sound may be caused. Since the abnormal sound makes the user uncomfortable, it is needed to prevent the reverse tilt state.

Elastomers 32 are respectively provided at four corners of a surface of the display panel 3 in contact with the basis chassis 2. The elastomer 32 is a rubber-like member having elasticity. The display panel 3 is in contact with the basis chassis 2 via the elastomers 32. The elastomers 32 are elastically deformed, so that it is possible to rigidly fix the display panel 3 to the basis chassis 2.

<1-2. Operations of Display Panel>

Operations of the display panel 3 are described. FIGS. 4 to 7 are side views depicting the electronic device 1 as seen from a side (the −X-side), illustrating the inclined state of the display panel 3. In the meantime, in the respective drawings, some members are shown with being projected for convenience of explanation. Also, some configurations of the electronic device 1 are not shown.

Figure 4:
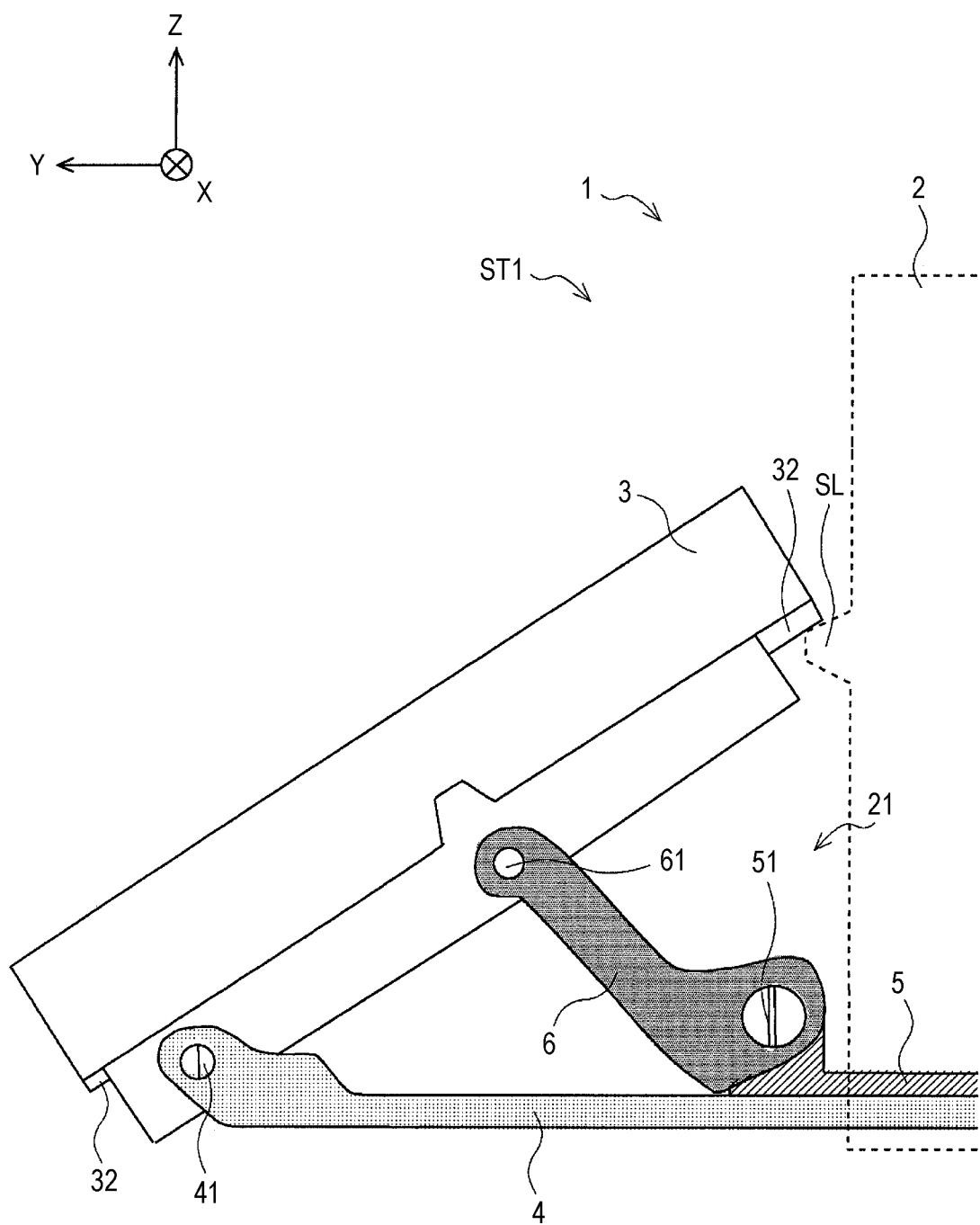
FIG. 4 is a side view depicting a completely opened state of the display panel.

FIG. 4 depicts the completely opened state ST1 of the display panel 3. In the completely opened state ST1 of the display panel 3, the elastomer 32 provided at the upper end of the display panel 3 is in contact with a convex part SL provided in the middle of the basis chassis 2 in a height direction (the Z-axis direction). Thereby, the display panel 3 is fixed to the basis chassis 2.

The tilt mechanism 21 has the main slider 4, a sub-slider 5, a motion link 6 and a motor (not shown).

The main slider 4 is a plate-shaped member, and has an arm part of which left and right (the X-axis direction) end portions extend in the front direction (the +Y direction). A tip of the arm part of the main slider 4 is connected to the lower end of the display panel 3 by a first connection part 41. The lower end of the display panel 3 can rotate about the first connection part 41.

The sub-slider 5 is a plate-shaped member, and has a convex part of which left and right (the X-axis direction) end portions protrude in the upward direction (the +Z direction).

The motion link 6 is a member configured to support the display panel 3. A length of the motion link 6 in a longitudinal direction is about a half of a size of the display panel 3 in the upper-lower direction. One end of the motion link 6 in the longitudinal direction is connected by a second connection part 61 provided in the vicinity of a center of the upper and lower ends of the display panel 3. The display panel 3 and the motion link 6 are configured to relatively rotate about the second connection part 61. The second connection part 61 is a rotary shaft when the tilt mechanism 21 tilts the display panel 3. A rotating direction of the display panel 3 is defined by a moving distance in the front-back direction (the Y-axis direction) of the main slider 4 connected to the lower end of the display panel 3. The other end of the motion link 6 is connected to the convex part of the sub-slider 5 by a third connection part 51. The other end of the motion link 6 can rotate about the third connection part 51. The motion link 6 functions as a support part of the electronic device 1.

The electronic device 1 has a position sensor (not shown). The position sensor is a variable resistor engaged with a part of the main slider 4, for example. The position sensor is configured to detect where the main slider 4 is positioned. Thereby, the electronic device 1 drives the motor (not shown) to move the main slider 4 to any position within a moveable range.

The main slider 4 is configured to linearly reciprocally move in the front-back direction (the Y-axis direction) in parallel with the bottom surface of the basis chassis 2 by a driving force supplied from the motor. The main slider 4 is configured to move in the direction (+Y direction) of separating from the basis chassis 2 over about 80% of a distance between the upper and lower ends of the display panel 3. The main slider 4 functions as a first movement part of the electronic device 1.

The sub-slider 5 is configured to linearly move in the front-back direction (the Y-axis direction) in parallel with the bottom surface of the basis chassis 2 by a driving force supplied from the main slider 4. The sub-slider 5 is configured to move in the direction (+Y direction) of separating from the basis chassis 2 over about 20% of the distance between the upper and lower ends of the display panel 3. The sub-slider 5 functions as a second movement part of the electronic device 1.

When the main slider 4 and the sub-slider 5 move in the direction (+Y direction) of separating from the basis chassis 2, the display panel 3 is rotated about the second connection part 61, which is a rotary shaft. When the elastomer 32 provided at the upper end of the display panel 3 is contacted to the convex part SL of the basis chassis 2, the display panel 3 becomes in the completely opened state ST1 where the display surface faces upwards obliquely and the interior of the basis chassis 2 is exposed. The operations of the main slider 4 and the sub-slider 5 will be described in detail later.

Figure 5:
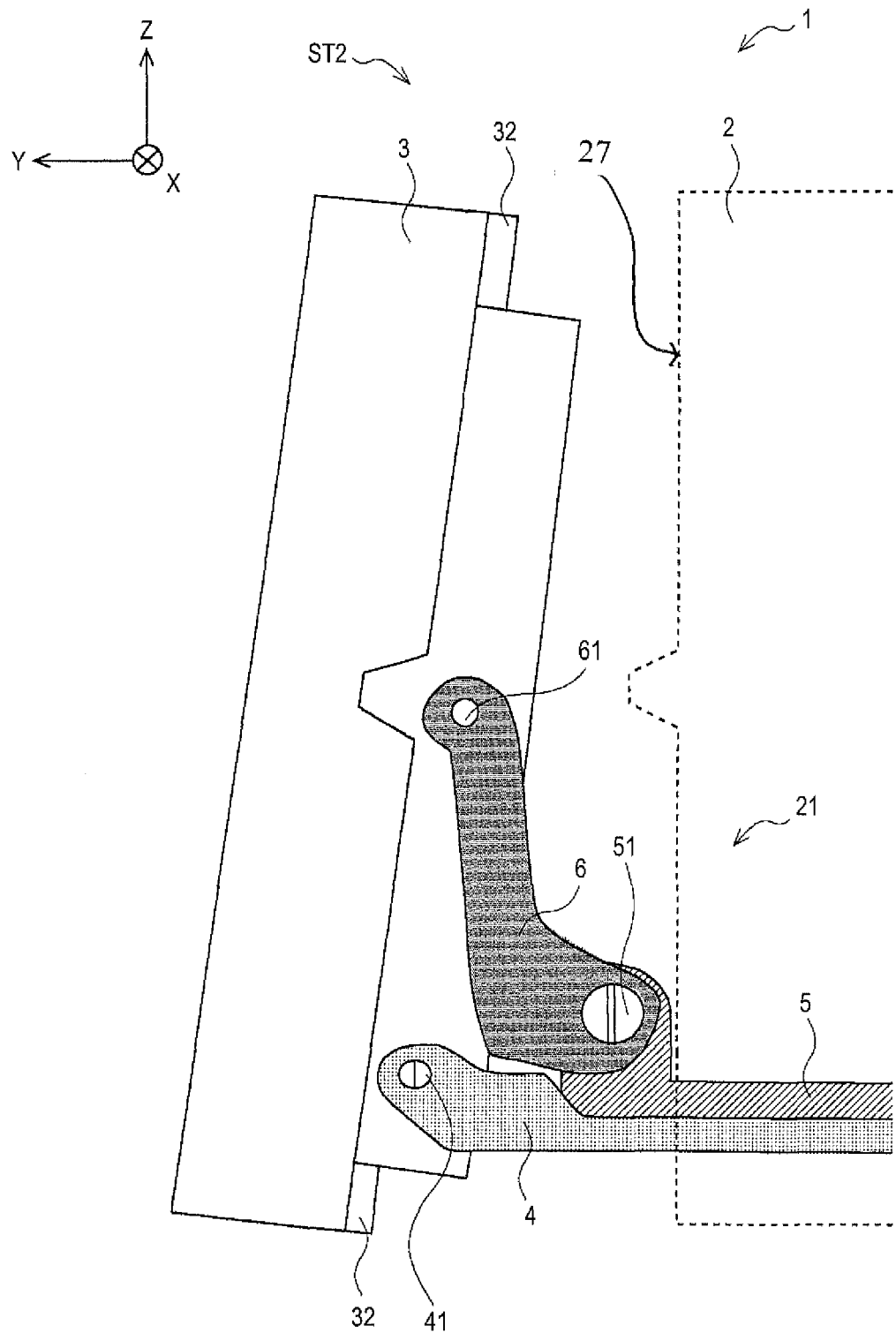
FIG. 5 is a side view depicting a half-opened state of the display panel.

FIG. 5 depicts the half-opened state ST2 of the display panel 3. The half-opened state ST2 is a state formed by moving the main slider 4 from the completely opened state ST1 of the display panel 3 (FIG. 4) towards the inner side (the −Y-side) of the basis chassis 2. At this time, the lower end of the display panel 3 is rotated about the second connection part 61 (a rotary shaft) in a direction of coming close to the basis chassis 2. Thereby, a direction of a line connecting the first connection part 41 and the second connection part 61 becomes closer to a perpendicular direction (the Z-axis direction), as compared to the completely opened state ST1. For this reason, a posture of the display panel 3 becomes close to the perpendicular direction (the Z-axis direction) and the display panel 3 becomes in the half-opened state ST2.

Figure 6:
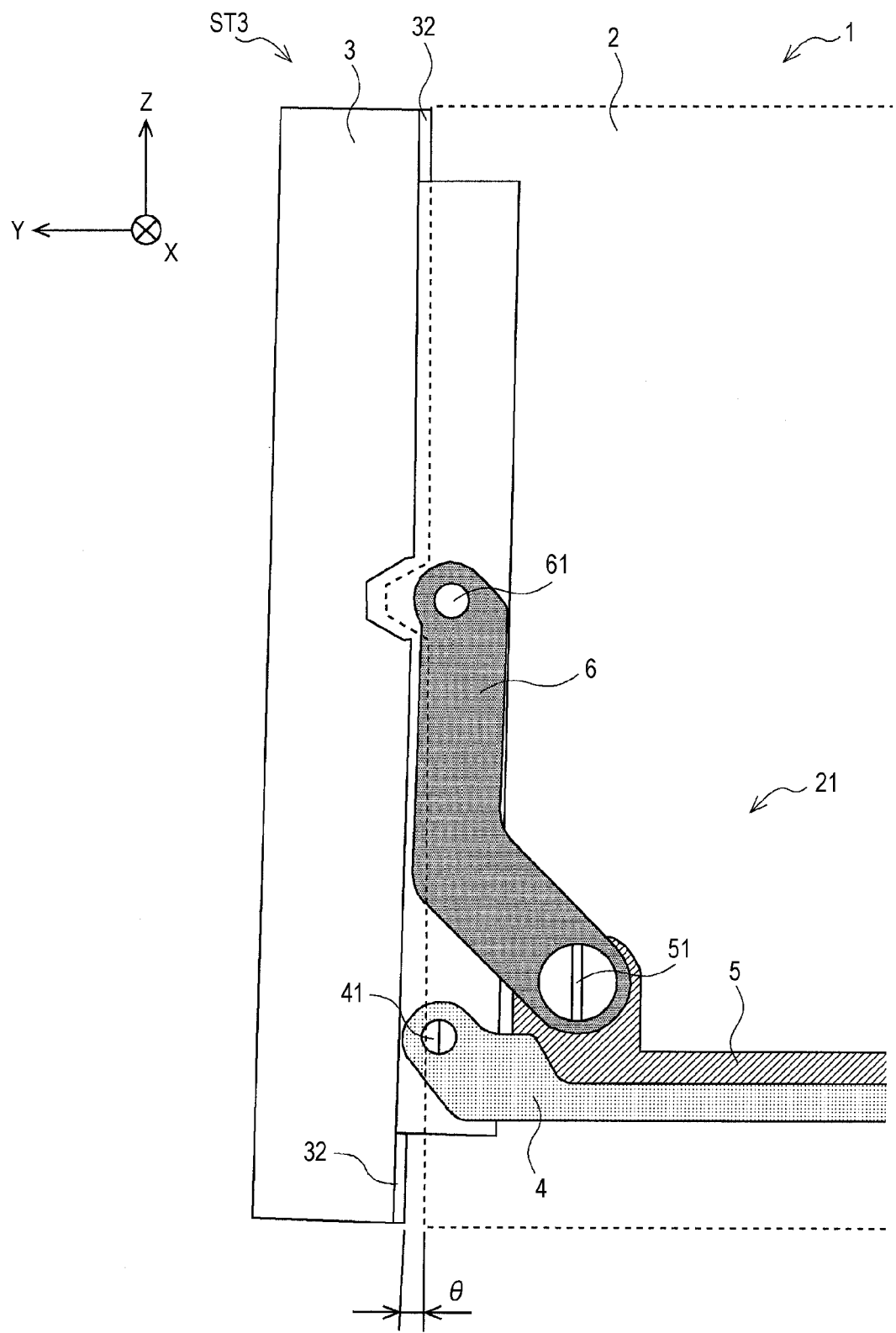
FIG. 6 is a side view depicting an upper end contact state of the display panel.

FIG. 6 depicts the upper end contact state ST3 of the display panel 3. The upper end contact state ST3 is a state formed by moving the main slider 4 and the sub-slider 5 from the half-opened state ST2 of the display panel 3 (FIG. 5) towards the inner side (the −Y-side) of the basis chassis 2 and is a state where the upper end of the display panel 3 is in contact with the basis chassis 2. The lower end of the display panel 3 is further rotated about the second connection part 61 (a rotary shaft) from the half-opened state ST2 of FIG. 5 in the direction of coming close to the basis chassis 2. Thereby, the posture of the display panel 3 becomes closer to the perpendicular direction (the Z-axis direction), as compared to the half-opened state ST2. In the upper end contact state ST3, an inclined angle of the display panel 3 is an angle θ relative to the perpendicular direction (the Z-axis direction). The angle θ is 1.6°, for example. At this time, the first connection part 41 is disposed at a position closer to the front surface-side (the +Y-side) of the display panel 3 than the second connection part 61 so that the inclined angle of the display panel 3 becomes the angle θ. Thereby, the upper end of the display panel 3 is contacted to the basis chassis 2 earlier than the lower end of the display panel 3. That is, a state where only the upper end of the display panel 3 is in contact with the basis chassis 2 is formed. The main slider 4 and the sub-slider 5 are arranged so that the first connection part 41 is arranged at the position more distant from the basis chassis 2 than the second connection part 61 and only the upper end of the display panel 3 is contacted to the basis chassis 2. Thereby, it is possible to prevent the display panel 3 from contacting the basis chassis 2 in the reverse tilt state. That is, the lower end of the display panel 3 is tilted by the angle θ in the direction of separating from the basis chassis 2, so that even when the upper end of the display panel 3 is slightly bent in the direction of separating from the basis chassis 2 due to the aging deterioration or the like, it is possible to prevent the great reverse tilt state as shown in FIG. 3. Also, the upper end of the display panel 3 to which the driving force of the tilt mechanism 21 is difficult to be transmitted because the main slider 4 is not connected thereto is first contacted to the basis chassis 2, and the lower end to which the main slider 4 is connected is later contacted to the basis chassis 2. Thereby, it is possible to bring the display panel 3 into rigid contact with the basis chassis 2 as a whole.

Figure 7:
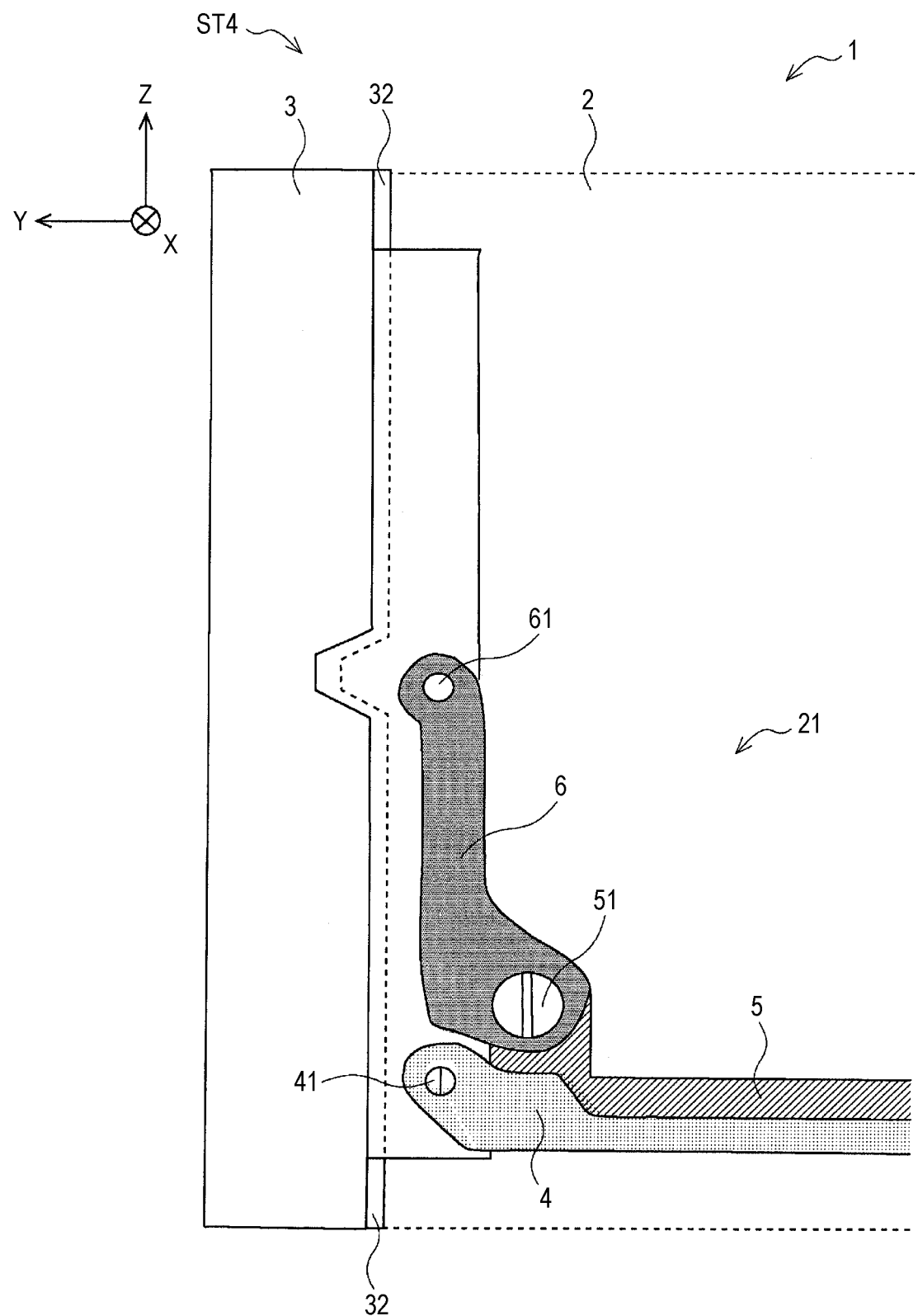
FIG. 7 is a side view depicting a completely closed state of the display panel.

FIG. 7 depicts the completely closed state ST4 of the display panel 3. The completely closed state ST4 is a state formed by moving the main slider 4 from the upper end contact state ST3 of the display panel 3 (FIG. 6) towards the inner side (the −Y-side) of the basis chassis 2, and is a state where the upper end and the lower end of the display panel 3 are in contact with the basis chassis 2. That is, the completely closed state ST4 is a state where the backside (an opposite side to the display surface) of the display panel 3 is in contact with the basis chassis 2. The 'state where the backside of the display panel 3 is in contact with the basis chassis 2' includes a state where the elastomers 32 disposed on the backside of the display panel 3 are in contact with the basis chassis 2. The elastomers 32 of the lower end of the display panel 3 are contacted to the basis chassis 2, so that the completely closed state ST4 where the entire inside of the basis chassis 2 is covered by the display panel 3 is formed. That is, the angle θ shown in the upper end contact state ST3 is 0°.

The main slider 4 is configured to move during all transition processes from the state ST1 to the state ST4 of the display panel 3. The sub-slider 5 is configured to move during the transition process from the state ST2 to the state ST3 of the display panel 3. The sub-slider 5 is configured to move together with the main slider 4 during the transition process from the state ST2 to the state ST3 of the display panel 3, so that a space is formed between the upper end of the display panel 3 and the basis chassis 2 and the upper end of the display panel 3 can be thus rotated without contacting the basis chassis 2. The space is particularly effective when the display panel 3 transitions from the completely closed state ST4 to the half-opened state ST2. On the other hand, an opposite operation to the above operation is carried out for the display panel 3 when the display panel 3 transitions from the completely closed state ST4 to the completely opened state ST1 via the upper end contact state ST3 and the half-opened state ST2.

<1-3. Operations of Sliders>

In the below, operations of the main slider 4 and the sub-slider 5 are described. FIGS. 8 to 11 are plan views depicting the electronic device 1 as seen from above (the +Z-side), illustrating the operations of the main slider 4 and the sub-slider 5. In the meantime, in the respective drawings, some members are shown with being projected for convenience of explanation. Also, some configurations of the electronic device 1 are not shown. The display panel 3 is shown with the dotted line.

Figure 8:
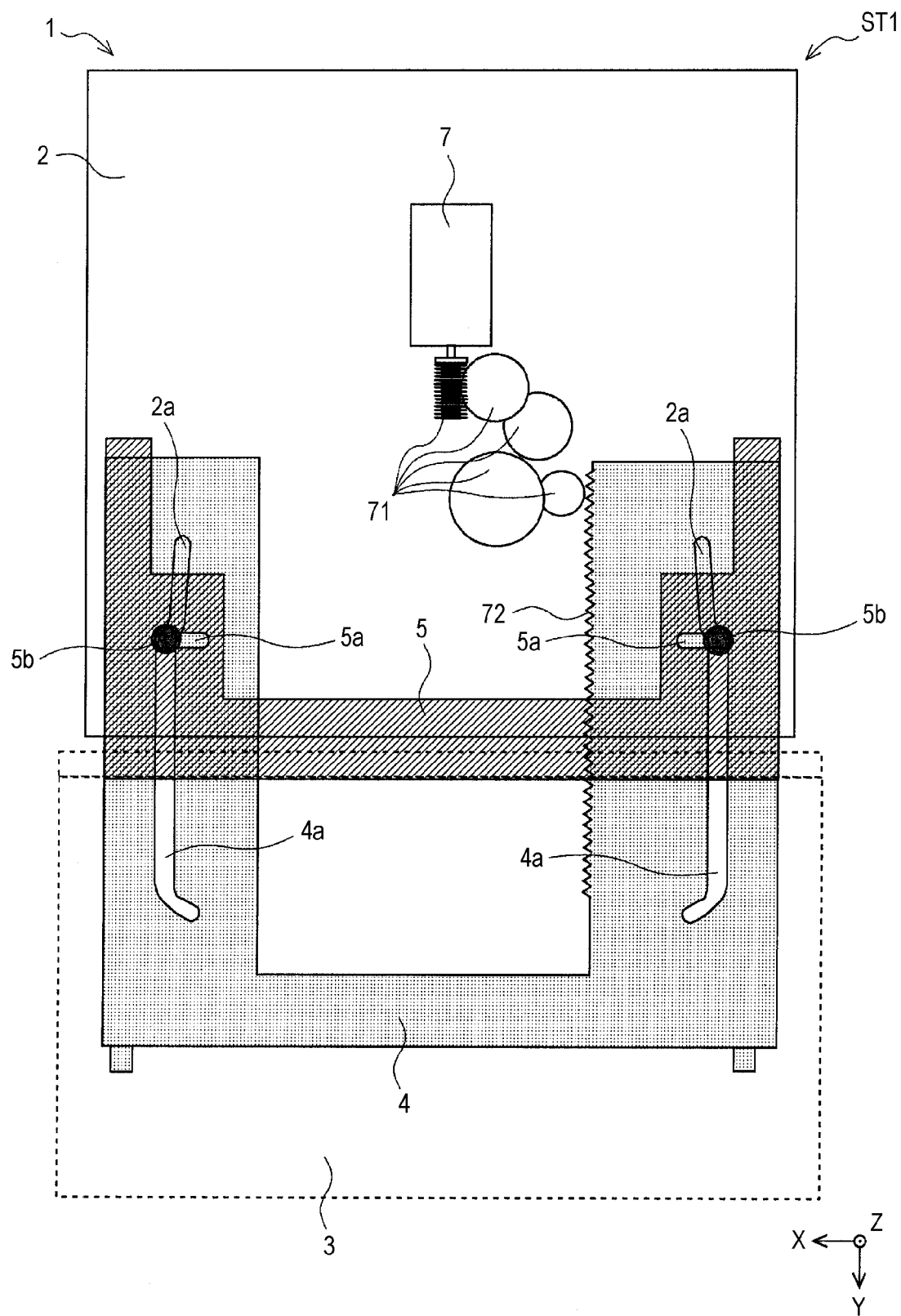
FIG. 8 is a plan view depicting states of a main slider and a sub-slider in the completely opened state.

FIG. 8 depicts the completely opened state ST1 of the display panel 3.

The basis chassis 2 has two guide recesses 2a extending in the front-back direction (the Y-axis direction). A rear end portion (an end portion of the −Y-side) of each guide recess 2a is closer to a center in the left-right direction (the X-axis direction) of the basis chassis 2 than a front end portion (an end portion of the +Y-side).

The main slider 4 has two guide recesses 2a extending in the front-back direction (the Y-axis direction). A front end portion (an end portion of the +Y-side) of each guide recess 4a is bent towards the center in the left-right direction (the X-axis direction) of the basis chassis 2.

The sub-slider 5 has two guide recesses 5a extending in the left-right direction (the X-axis direction).

Two fixing shafts 5b are fitted in the two guide recesses 2a, the two guide recesses 4a and the two guide recesses 5a, respectively. In the meantime, the two fixing shafts 5b are not fixed to any of the basis chassis 2, the main slider 4 and the sub-slider 5. In the completely opened state ST1 of the display panel 3, each of the fixing shafts 5b is positioned at a front end (the +Y-side) of the corresponding guide recess 2a, a rear end (the −Y-side) of the corresponding guide recess 4a and an outer end (an end portion positioned at an outer side in the left-right direction of the basis chassis 2) of the corresponding guide recess 5a.

The tilt mechanism 21 has a motor 7 configured to generate a driving force and a plurality of gears 71 configured to transmit the driving force of the motor 7. The motor 7 and the plurality of gears 71 are arranged on the bottom surface of the basis chassis 2.

The main slider 4 has a rack gear 72 extending in the front-back direction (the Y-axis direction). The rack gear 72 is engaged with one of a plurality of gears 71. The driving force of the motor 7 is transmitted to the main slider 4 via the plurality of gears 71 and the rack gear 72.

In the completely opened state ST1 of the display panel 3, when the motor 7 is rotated, the main slider 4 is moved towards the inner side (the −Y-side) of the basis chassis 2. At this time, the sub-slider 5 is not moved. The reason is that the driving force is not applied thereto. As the main slider 4 is moved, each fixing shaft 5b reaches a front end portion (a position bent towards the center in the left-right direction of the basis chassis 2) of the corresponding guide recess 4a.

Figure 9:
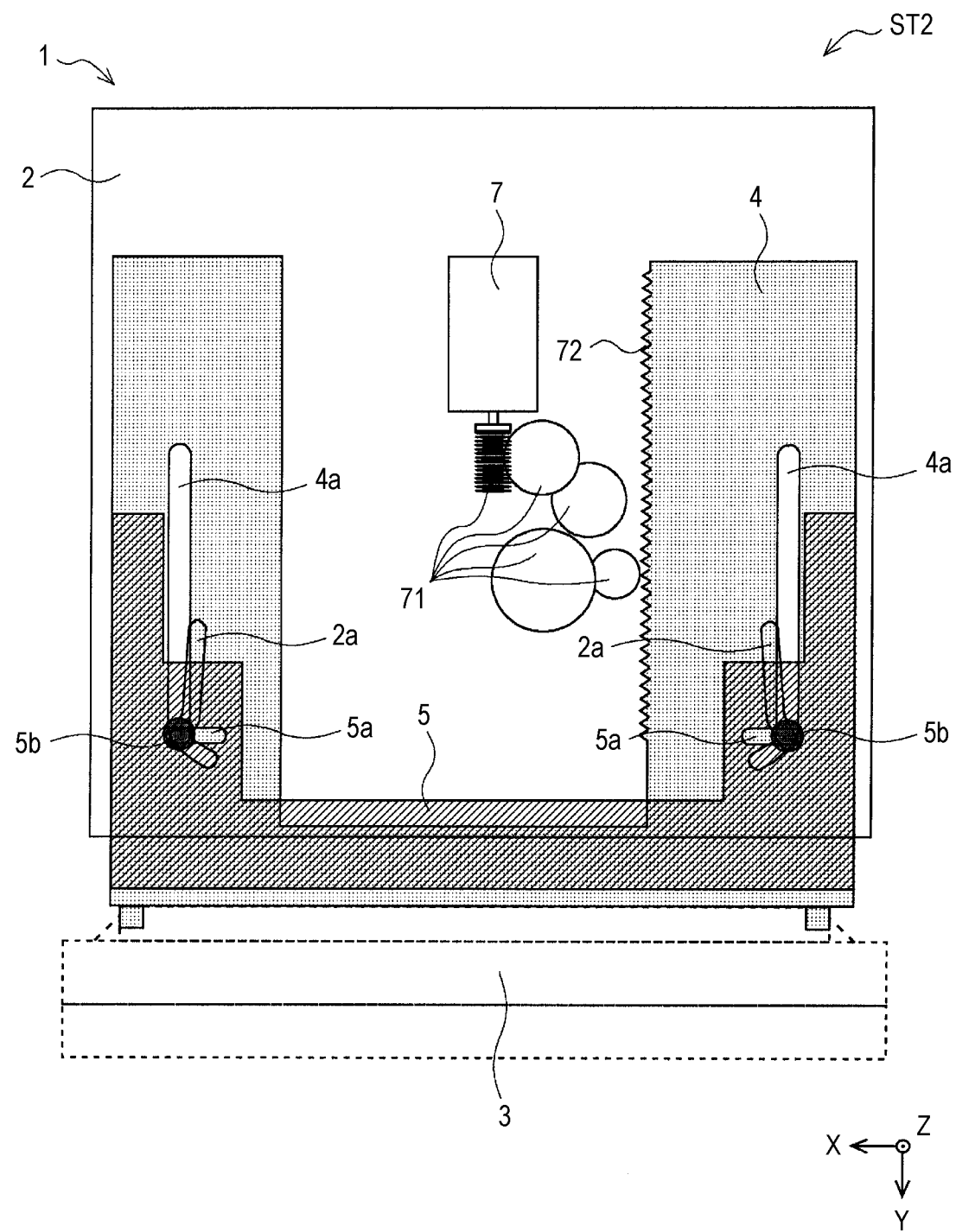
FIG. 9 is a plan view depicting states of the main slider and the sub-slider in the half-opened state.

FIG. 9 depicts the half-opened state ST2 of the display panel 3. At this time, each fixing shaft 5b has reached the front end portion of the corresponding guide recess 4a.

In the half-opened state ST2 of the display panel 3, when the motor 7 is further rotated, the force of moving the main slider 4 towards the inner side (the −Y-side) of the basis chassis 2 is applied. Since the front end portion of each guide recess 4a is bent towards the center in the left-right direction of the basis chassis 2, each fixing shaft 5b is moved towards an inner end of the corresponding guide recess 5a of the sub-slider 5. Thereby, each fixing shaft 5b is permitted to move towards a rear end of the corresponding guide recess 2a of the basis chassis 2. As each fixing shaft 5b comes close to the inner end of the corresponding guide recess 5a, the fixing shaft 5b moves towards the front end of the corresponding guide recess 4a and towards the rear end of the corresponding guide recess 2a. Thereby, both the main slider 4 and the sub-slider 5 are displaced towards the inner side (the −Y-side) of the basis chassis 2.

Each guide recess 2a extends obliquely towards the rear end portion so that it comes close to the center in the left-right direction of the basis chassis 2. For this reason, the moving speed of the sub-slider 5 is slower than the moving speed of the main slider 4 at the time that it reaches the half-opened state ST2 from the completely opened state ST1.

Figure 10:
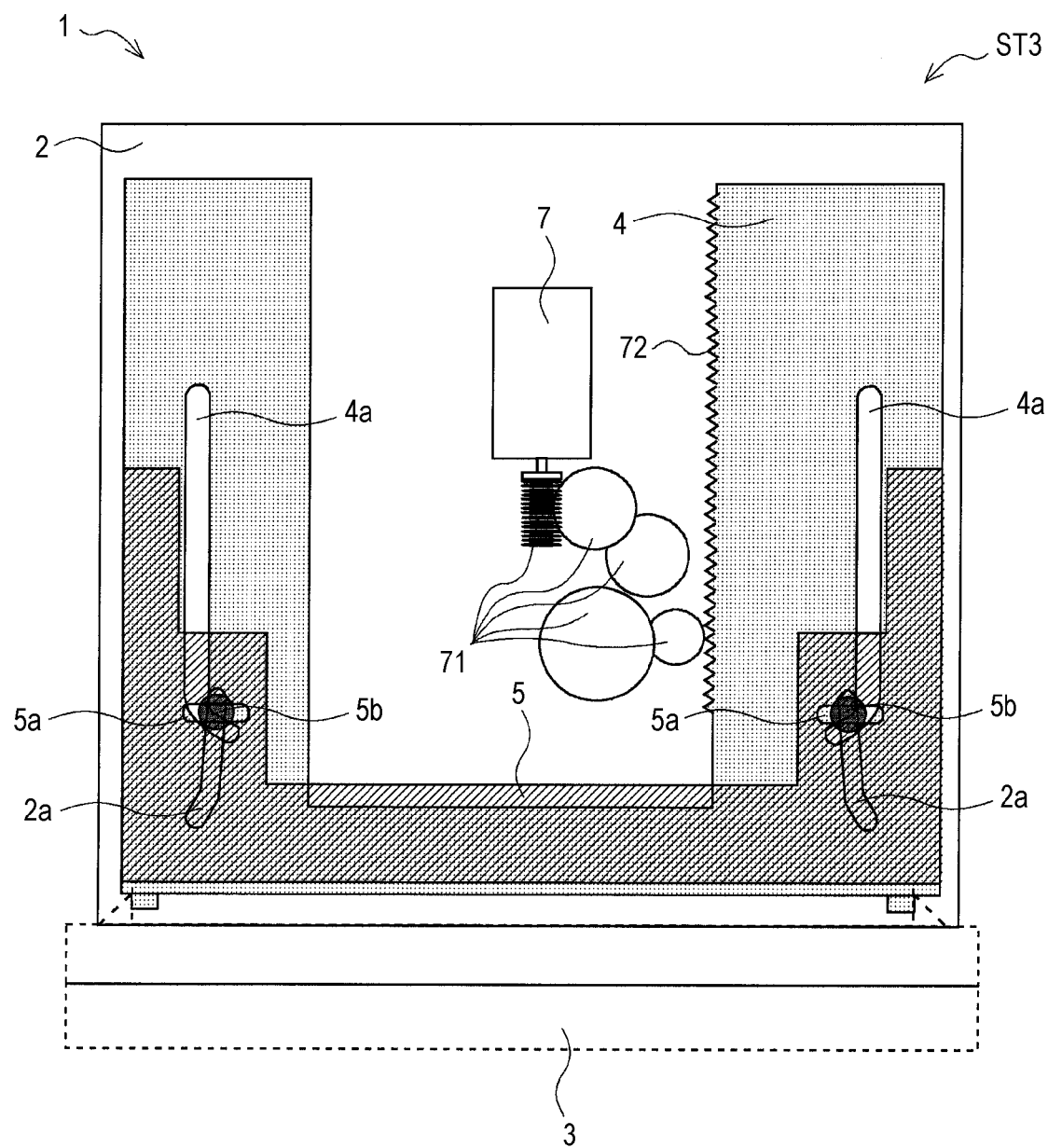
FIG. 10 is a plan view depicting states of the main slider and the sub-slider in the upper end contact state.

FIG. 10 depicts the upper end contact state ST3 of the display panel 3. At this time, each fixing shaft 5b has reached the rear end of the corresponding guide recess 2a and in the vicinity of the front end of the corresponding guide recess 4a. As described above, in the upper end contact state ST3, the upper end of the display panel 3 is in contact with the basis chassis 2. At this time, each fixing shaft 5b has not reached yet the front end of the corresponding guide recess 4a. For this reason, the lower end of the display panel 3 has not been contacted yet to the basis chassis 2.

In the upper end contact state ST3 of the display panel 3, when the motor 7 is further rotated, the force of further moving the main slider 4 towards the inner side (the −Y-side) of the basis chassis 2 is applied. Thereby, each fixing shaft 5b reaches the front end of the corresponding guide recess 4a. Thereby, the lower end of the display panel 3 to which the main slider 4 is connected is contacted to the basis chassis 2. That is, the posture angle θ of the display panel 3 relative to the perpendicular direction is zero and the display panel 3 becomes in the completely closed state. At this time, the upper end of the display panel 3 is first contacted to the front surface of the basis chassis 2 and the lower end of the display panel 3 to which the main slider 4 is connected is then contacted to the front surface of the basis chassis 2. Therefore, it is possible to prevent the lower end of the display panel 3 from contacting the front surface of the basis chassis 2 in the reverse tilt state and to rigidly fix the display panel 3 to the basis chassis 2.

Figure 11:
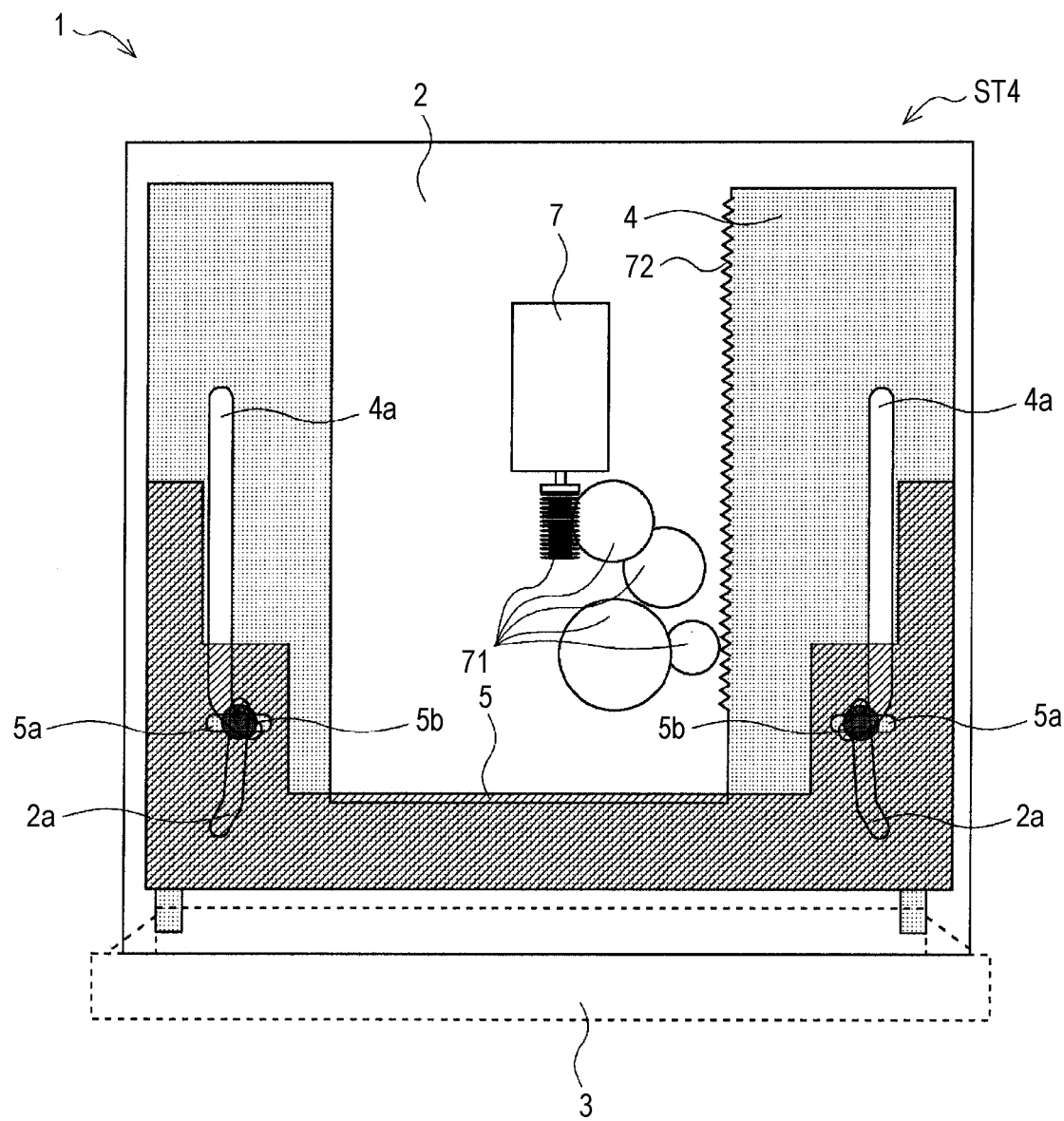
FIG. 11 is a plan view depicting states of the main slider and the sub-slider in the completely closed state.

FIG. 11 depicts the completely closed state ST4 of the display panel 3. At this time, the fixing shaft 5b has reached the front end of the corresponding guide recess 4a. In this state, the display panel 3 is fixed to the front surface of the basis chassis 2 with the posture angle θ relative to the perpendicular direction being zero. Since the upper end of the display panel 3 is first contacted to the basis chassis 2, it is possible to prevent the lower end of the display panel 3 from contacting the front surface of the basis chassis 2 in the reverse tilt state. Therefore, the display panel 3 is rigidly fixed to the basis chassis 2.

On the other hand, the reverse operations to the above operations are carried out for the main slider 4, the sub-slider 5 and the like when moving the display panel 3 from the completely closed state ST4 to the completely opened state ST1 via the upper end contact state ST3 and the half-opened state ST2.

Subsequently, a positional relation among the main slider 4, the sub-slider 5 and the motion link 6 is described. FIGS. 12 to 15 are perspective views depicting the positional relation among the main slider 4, the sub-slider 5 and the motion link 6. In the respective drawings, the display panel 3 is not shown.

Figure 12:
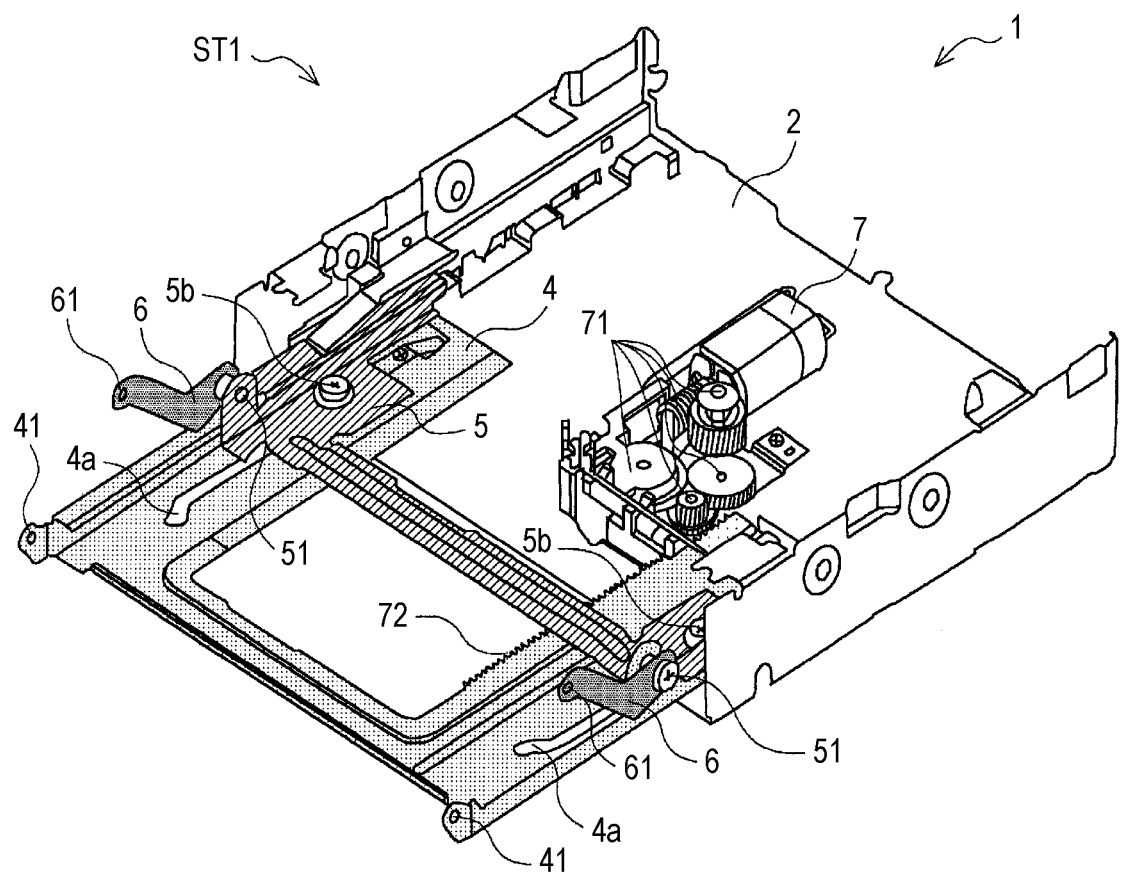
FIG. 12 is a perspective view depicting a positional relation among the main slider, the sub-slider and a motion link in the completely opened state.

FIG. 12 depicts the completely opened state ST1 of the display panel 3. The front end portion of the main slider 4 is positioned distant from the basis chassis 2. The sub-slider 5 is positioned at the front end portion of the basis chassis 2. The second connection part 61 of the motion link 6 and the display panel 3 is positioned in the vicinity of the bottom surface of the basis chassis 2. For this reason, the display surface of the display panel 3 faces obliquely towards the upper side (a direction of the +Z-side and the +Y-side and close to the Z-axis).

Figure 13:
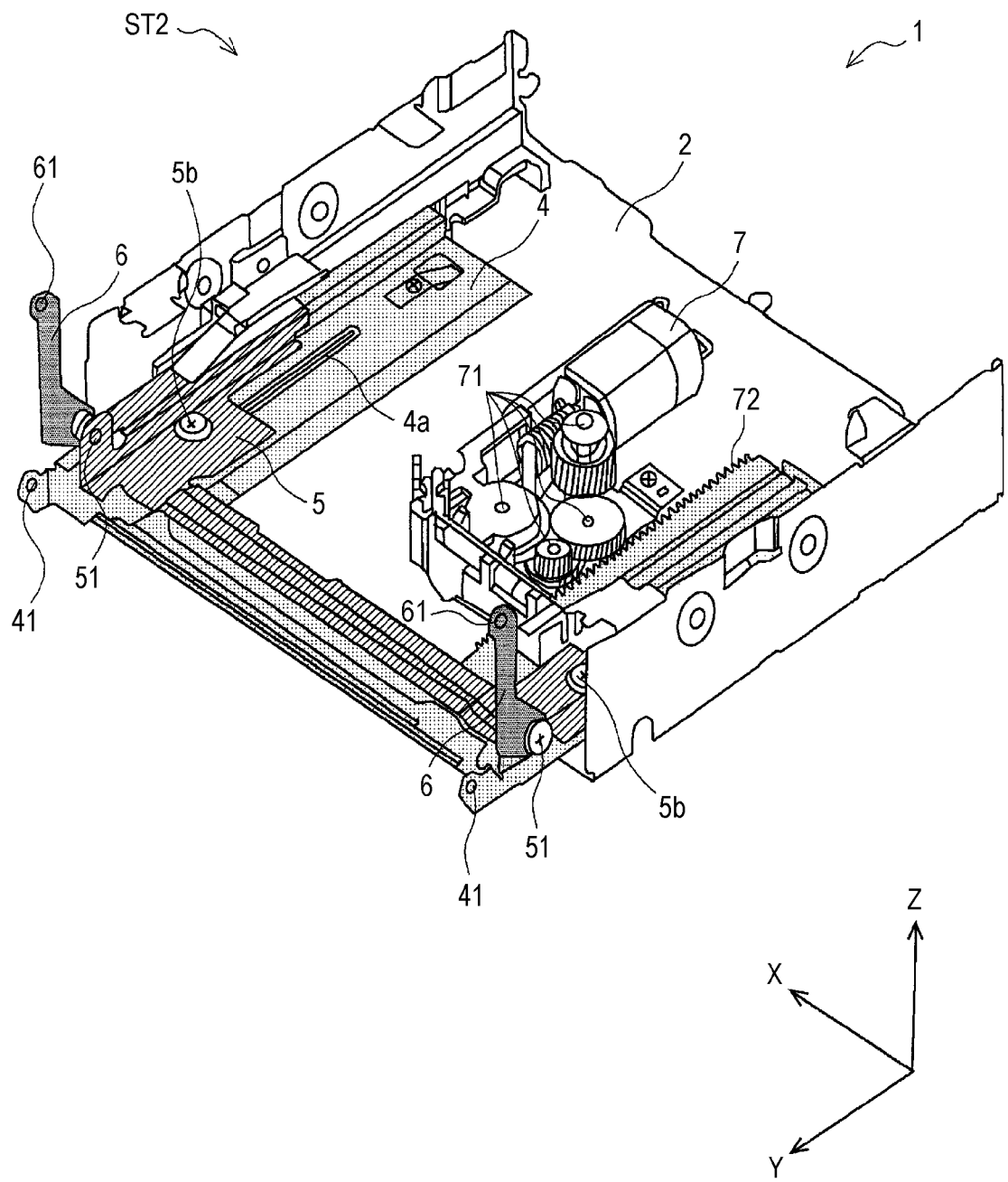
FIG. 13 is a perspective view depicting a positional relation among the main slider, the sub-slider and the motion link in the half-opened state.

FIG. 13 depicts the half-opened state ST2 of the display panel 3. The main slider 4 is accommodated in the basis chassis 2 except for the front end portion. The sub-slider 5 is located at the same position as the completely opened state ST1. As the main slider 4 is moved rearwards, a distance between the first connection part 41 and the second connection part 61 in the front-back direction (the Y-axis direction) is shortened and the longitudinal direction of the motion link 6 comes close to the perpendicular direction (the Z-axis direction). For this reason, the display surface of the display panel 3 faces obliquely towards the front side (a direction of the +Z-side and the +Y-side and close to the Y-axis).

Figure 14:
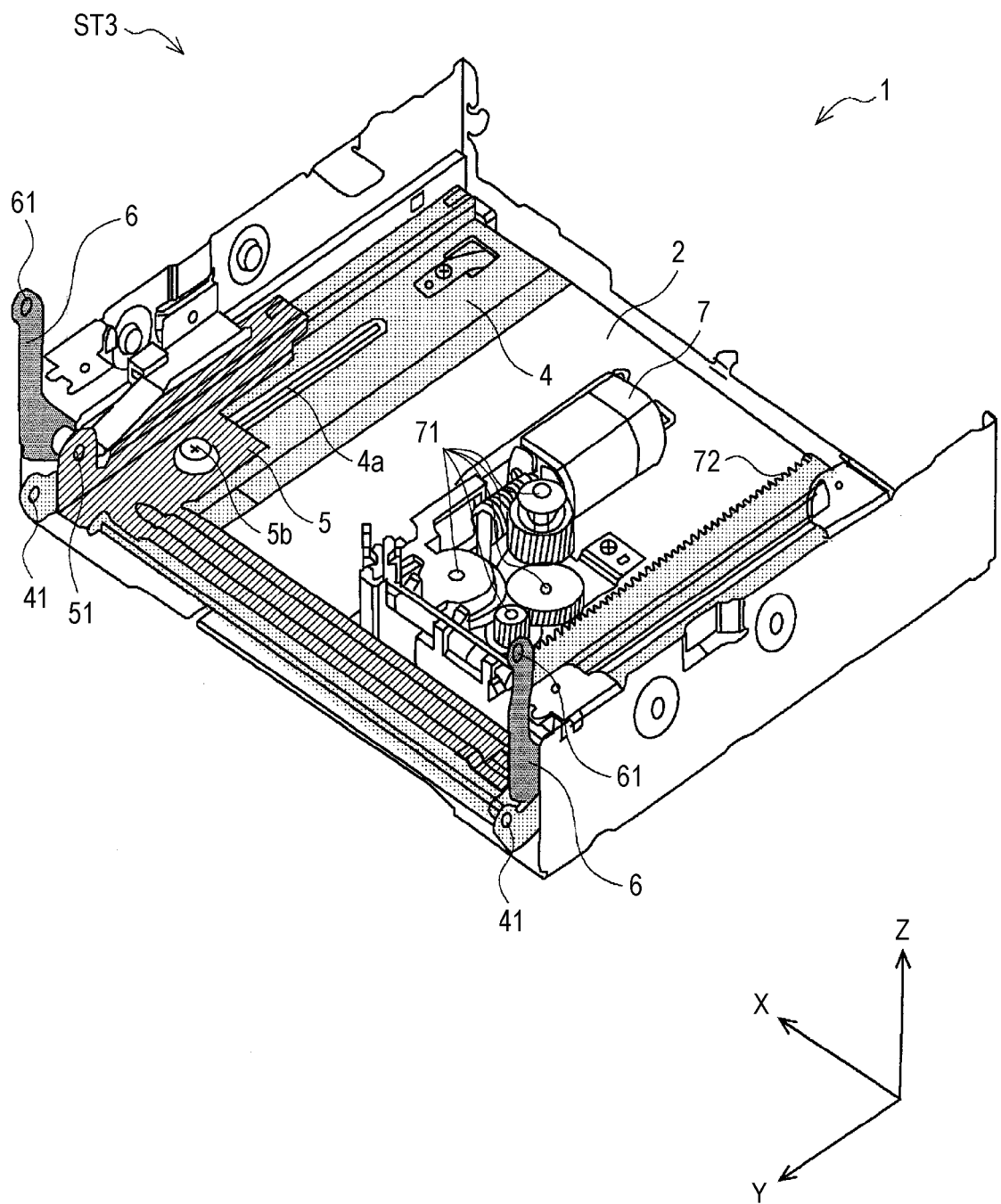
FIG. 14 is a perspective view depicting a positional relation among the main slider, the sub-slider and the motion link in the upper end contact state.

FIG. 14 depicts the upper end contact state ST3 of the display panel 3. The front end portion of the main slider 4 is partially positioned outside the basis chassis 2. Thereby, the posture angle θ described with reference to FIG. 6 is formed. The sub-slider 5 is positioned at the absolute rear of the moveable range and is entirely accommodated in the basis chassis 2. The longitudinal direction of the motion link 6 comes closer to the perpendicular direction (the Z-axis direction), as compared to the half-opened state ST2.

Figure 15:
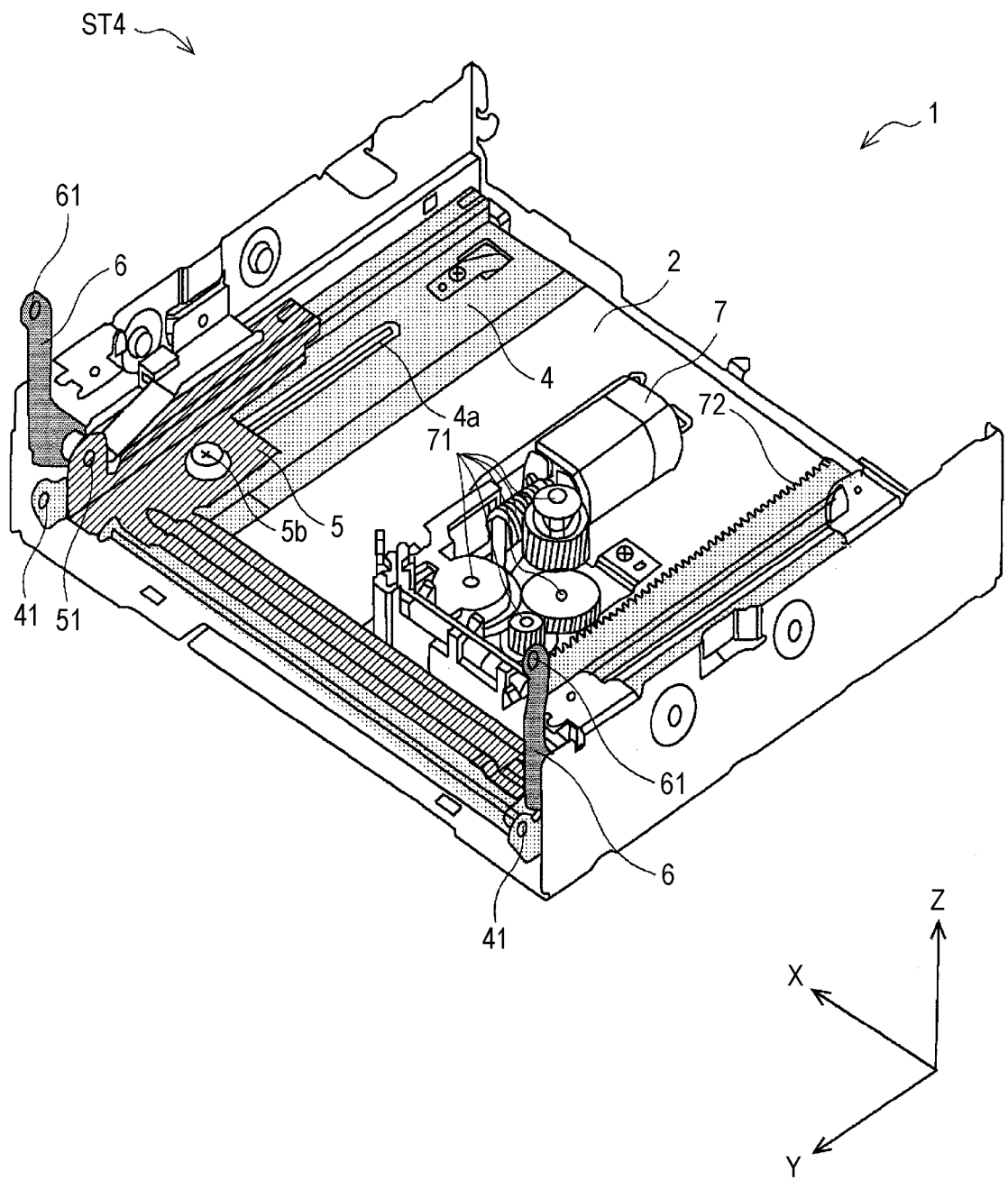
FIG. 15 is a perspective view depicting a positional relation among the main slider, the sub-slider and the motion link in the completely closed state.

FIG. 15 depicts the completely closed state ST4 of the display panel 3. The main slider 4 and the sub-slider 5 are entirely accommodated in the basis chassis 2. The longitudinal direction of the motion link 6 faces towards the substantially perpendicular direction (the Z-axis direction). Thereby, the first connection part 41 and the second connection part 61 are positioned in a line in the substantially perpendicular direction (the Z-axis direction).

<1-4. Electrical Configuration>

Figure 16:
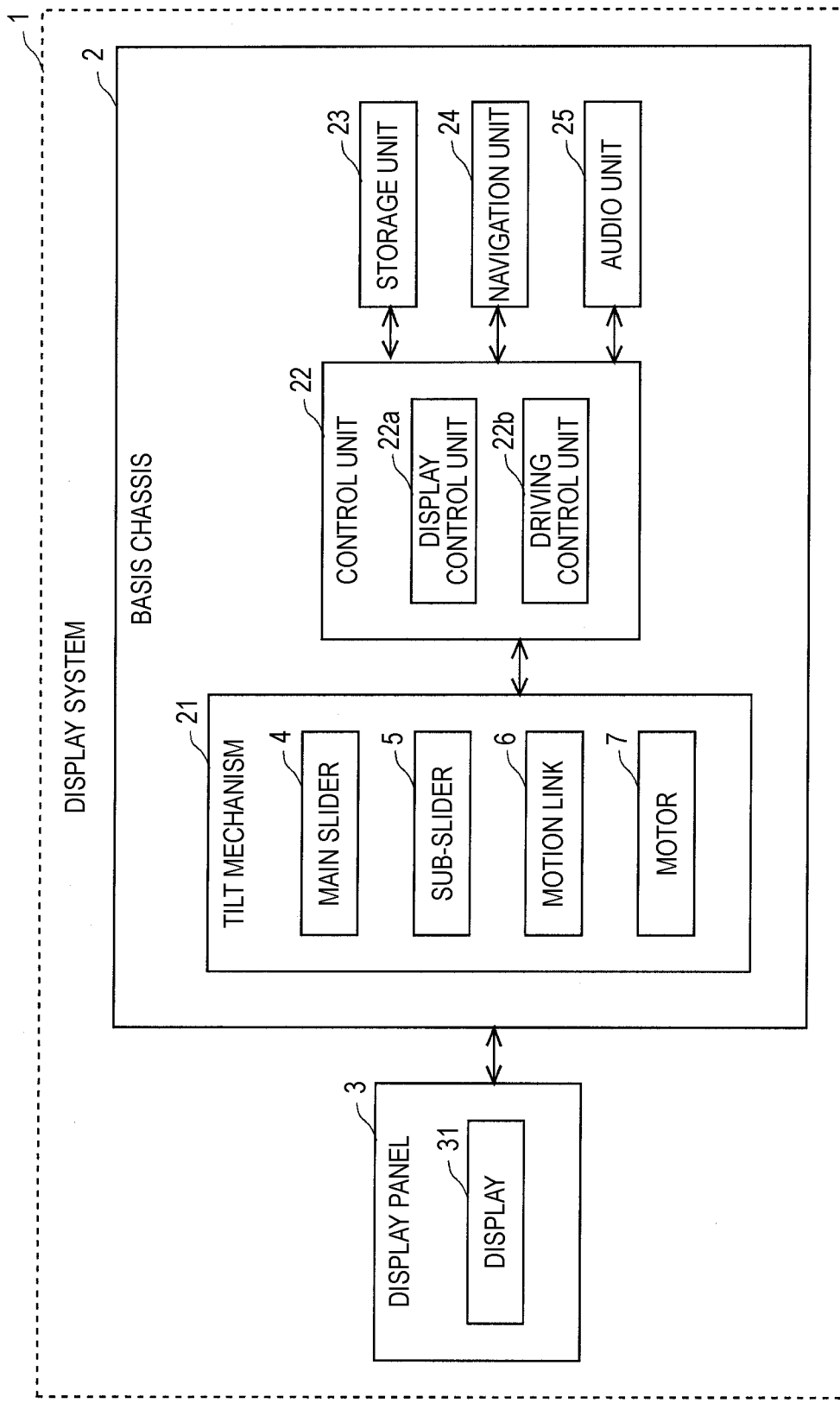
FIG. 16 is a block diagram depicting an electrical configuration of the electronic device.

In the below, an electrical configuration of the electronic device 1 is described with reference to FIG. 16.

The electronic device 1 has a control unit 22, a storage unit 23, a navigation unit 24 and an audio unit 25, as electrical processing units, in addition to the display panel 3 and the tilt mechanism 21. The electrical processing units are arranged on a substrate provided in the basis chassis 2. At least some of the electrical processing units may be arranged in the display panel 3.

The control unit 22 is a microcomputer having a CPU, a RAM and a ROM. The control unit 22 is configured to execute a pre-stored program, thereby collectively control the electronic device 1 as a whole. The control unit 22 is electrically connected to the display 31 of the display panel 3 and the tilt mechanism 21 and is configured to control the operations of the display 31 and the tilt mechanism 21. Operations of a display control unit 22a and a driving control unit 22b, which will be described later, are parts of functions that are to be implemented as the CPU executes the program.

The display control unit 22a is configured to generate image data such as a map, a letter and the like and to display an image on the display 31.

The driving control unit 22b is configured to control the operations of the main slider 4, the sub-slider 5 and the motion link 6 by rotating the motor 7 of the tilt mechanism 21. At this time, the driving control unit 22b is configured to receive a signal of the position sensor of the tilt mechanism 21, thereby detecting the inclined angle of the display panel 3. The driving control unit 22b is configured to control the tilt mechanism 21 on the basis of the detected inclined angle of the display panel 3, thereby setting the state of the display panel 3 to any one from the completely opened state ST1 to the completely closed state ST4 shown in FIGS. 4 to 7.

The storage unit 23 is a non-volatile storage device (for example, a flash memory) capable of storing therein diverse data. The storage unit 23 is configured to store therein a variety of data necessary to operate the electronic device 1.

The navigation unit 24 is configured to implement a navigation function of guiding a route to a destination by using the map stored in the storage unit 23.

The audio unit 25 is configured to implement an audio function of outputting voice into a vehicle interior by using voice data stored in the storage unit 23.

As described above, according to the electronic device 1 of the first illustrative embodiment, in order to set the display panel 3 to the completely closed state ST4, the display panel 3 is inclined to bring the upper end of the display panel 3 into contact with the front surface of the basis chassis 2 and then to bring the lower end of the display panel 3 connected to the main slider 4 into contact with the front surface of the basis chassis 2. Thereby, the display panel 3 is prevented from contacting the front surface of the basis chassis 2 in the reverse tilt state. Therefore, it is possible to rigidly fix the display panel 3 to the basis chassis 2.

2. Second Illustrative Embodiment

In the below, a second illustrative embodiment is described. The same configurations as the first illustrative embodiment are denoted with the same reference numerals as the first illustrative embodiment and the overlapping description thereof is omitted.

<2-1. Problems>

Figure 17:
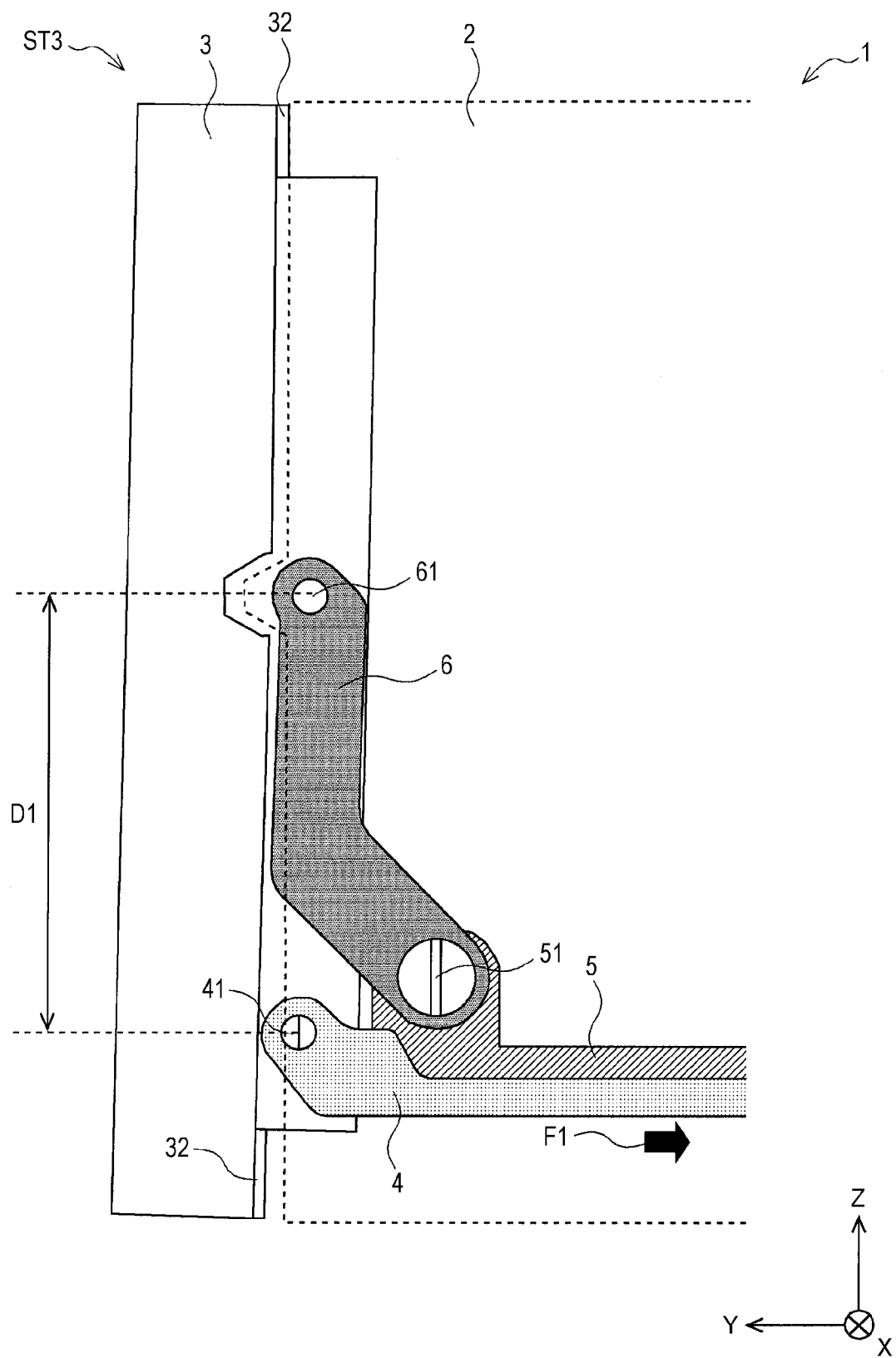
FIG. 17 depicts stress that is to be generated in an electronic device of a second illustrative embodiment.
Figure 18:
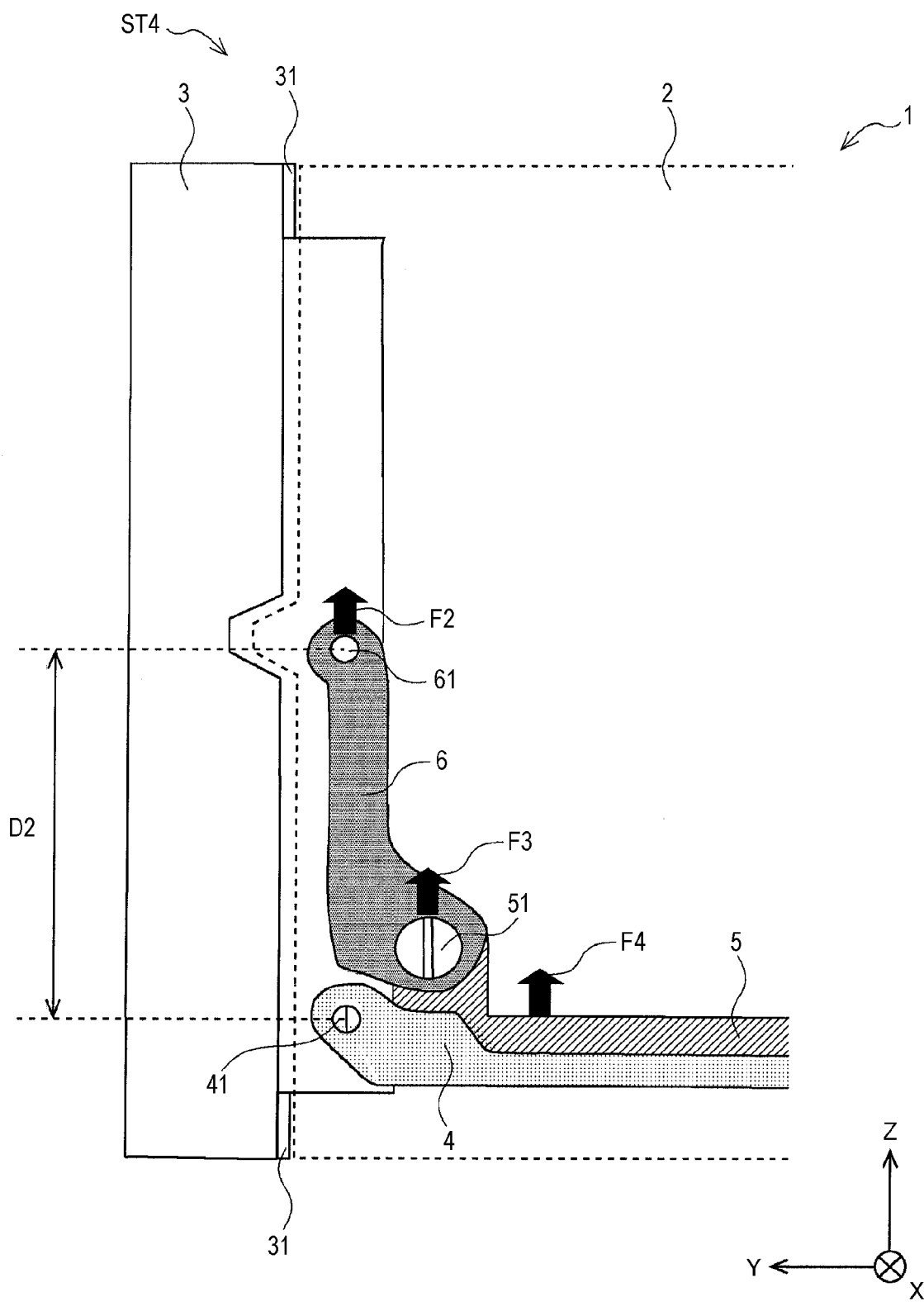
FIG. 18 depicts stress that is to be generated in the electronic device of FIG. 17.

FIG. 17 depicts the upper end contact state ST3 of the display panel 3 to the basis chassis 2. The second connection part 61 of the motion link 6 and the display panel 3 is closer to the basis chassis 2-side (the −Y direction), as compared to the first connection part 41 of the main slider 4 and the display panel 3. That is, the line connecting the first connection part 41 and the second connection part 61 extends obliquely with respect to the perpendicular direction (parallel with the Z-axis). At this time, a distance between the first connection part 41 and the second connection part 61 in the perpendicular direction (parallel with the Z-axis) is D1. Then, when power F1 is applied to the main slider 4, the main slider 4 is moved towards the inner side (the −Y direction) of the basis chassis 2 and transitions from the upper end contact state ST3 to the completely closed state ST4 shown in FIG. 18. In the completely closed state ST4, the line connecting the first connection part 41 and the second connection part 61 faces towards the perpendicular direction (parallel with the Z-axis). At this time, the distance therebetween in the perpendicular direction (parallel with the Z-axis) is D2. The distance D2 is slightly greater than the distance D1. The sub-slider 5 is pulled up by a difference between the distance D2 and the distance D1.

That is, in the completely closed state ST4, the distance between the first connection part 41 and the second connection part 61 in the perpendicular direction becomes greater from D1 to D2, so that push-up load F2 is applied to the second connection part 61 and pull-up load F3 is additionally applied to the third connection part 51. The pull-up load F3 acts as pull-up load F4 of pulling up the sub-slider 5 connected to the third connection part 51. The sub-slider 5 is pulled up from 0.1 mm to 0.6 mm by the pull-up load F4, for example.

When the pull-up load F4 is repeatedly applied to the sub-slider 5 as the opening and closing operation of the display panel 3 is repeated, the sub-slider 5 is bent upwards (the Z direction), so that deformation is caused. When the sub-slider 5 is deformed, the vibrations and the abnormal sound are caused. When the sub-slider 5 is deformed, the smooth opening and closing operation of the display panel 3 is interrupted, so that a failure may occur in the tilt mechanism 21.

<2-2. Configuration>

Figure 19:
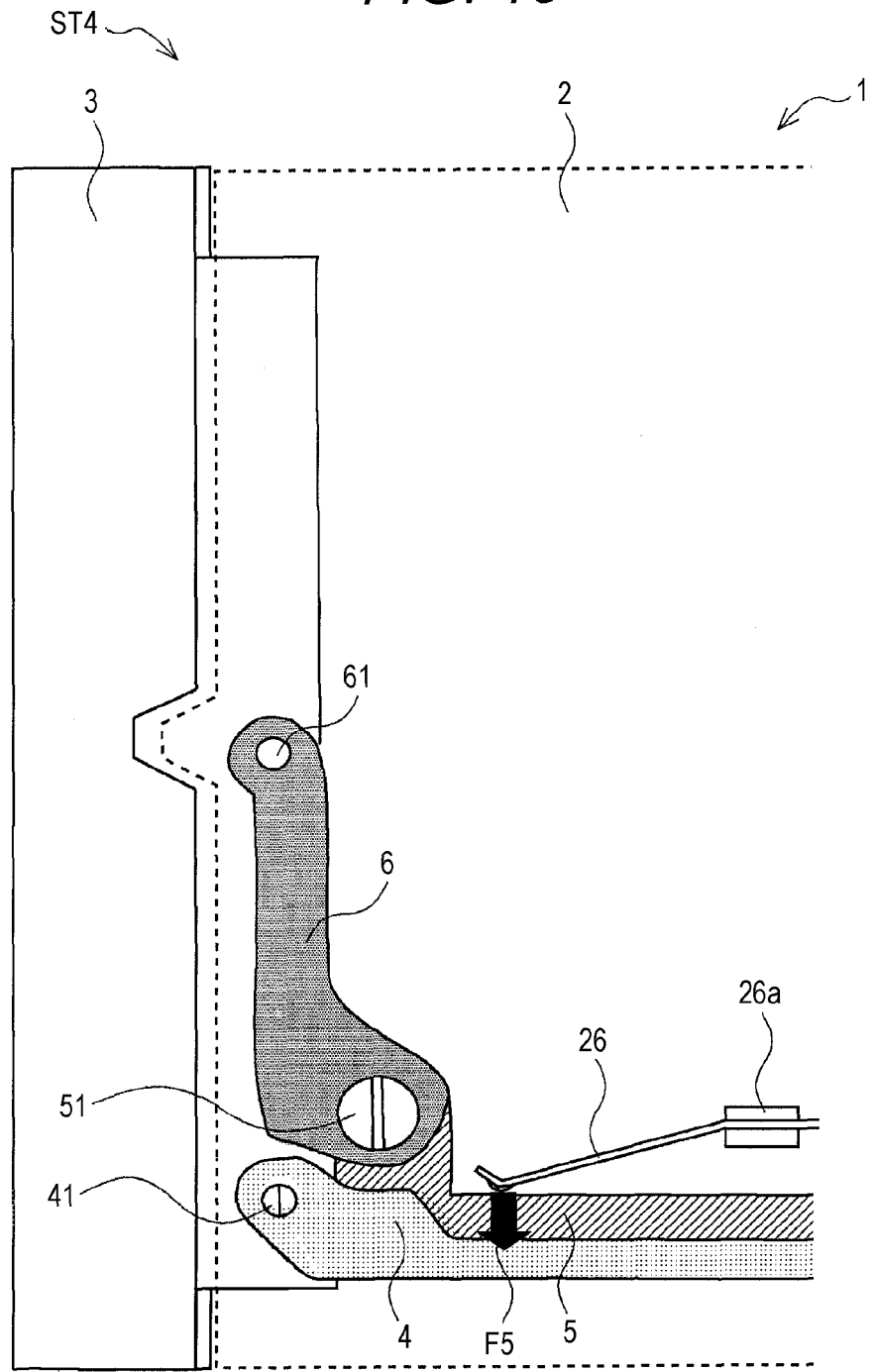
FIG. 19 is a side view depicting a pressing part of the electronic device of FIG. 17.

As shown in FIG. 19, the electronic device 1 of the second illustrative embodiment has a spring part 26 for suppressing the bending of the sub-slider 5.

The spring part 26 is a plate-shaped elastic member having a bent portion protruding downwards (the −Z-side). The bent portion is in contact with the sub-slider 5. In the meantime, the spring part 26 functions as a pressing part of the electronic device 1.

One end of the spring part 26 is connected to a connection part 26a arranged on an inner side wall surface (ZY plane) of the basis chassis 2. The spring part 26 is configured to apply a pressing force to the sub-slider 5 in an opposite direction (the −Z direction) to the pull-up load F4.

Figure 20:
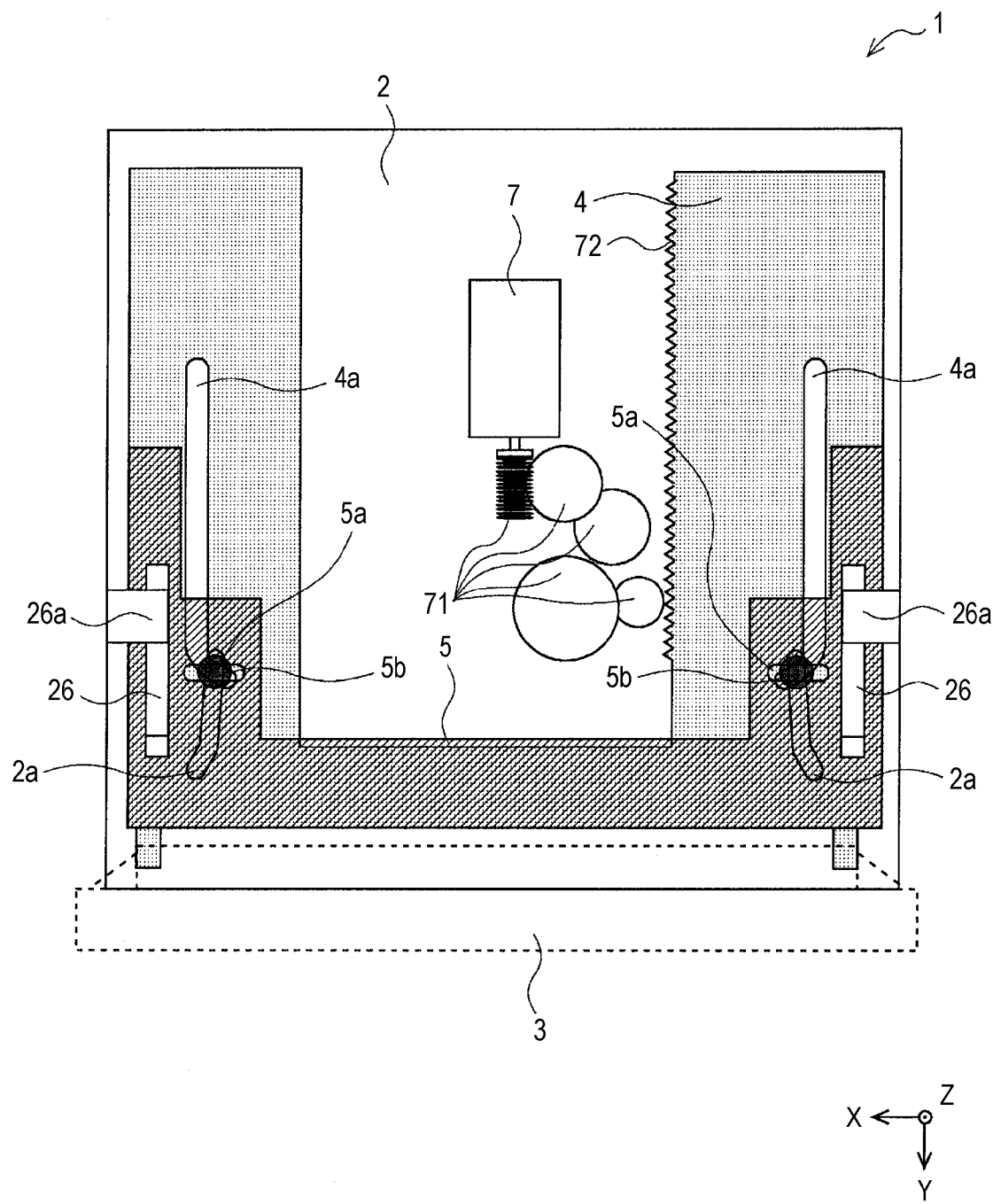
FIG. 20 is a plan view depicting the pressing part.

FIG. 20 is a plan view of the electronic device 1 in which the respective configurations are shown with being projected from the upper (the +Z direction) towards the lower (the −Z direction). The electronic device 1 has the two spring parts 26. The two spring parts 26 are respectively provided at left and right ends in the left-right direction (the X-axis direction) of the sub-slider 5. The reason is that the pull-up load F4 is applied to the sub-slider 5 at positions at which the sub-slider 5 is connected to the motion link 6, i.e., at both left and right end positions of the sub-slider 5.

In this way, the electronic device 1 of the second illustrative embodiment has the spring parts 26 for suppressing the deformation due to the bending of the sub-slider 5. Therefore, even when the pull-up load F4 is applied to the sub-slider 5, it is possible to alleviate the stress of bending the sub-slider 5 upwards (the Z direction). Thereby, it is possible to prevent the deformation of the sub-slider 5. Also, it is possible to prevent the vibrations and the abnormal sound due to the deformation of the sub-slider 5. For this reason, it is possible to prevent the failure of the tilt mechanism 21 and to keep the smooth opening and closing operation of the display panel 3.

3. Modified Embodiments

Although the illustrative embodiments of the present invention have been described, the present invention is not limited to the illustrative embodiments and a variety of modifications can be made. In the below, modified embodiments are described. All aspects including the above illustrative embodiments and modified embodiments to be described below can be appropriately combined.

In the above illustrative embodiments, the electronic device 1 is fixed to the vehicle such as an automobile. However, the electronic device 1 may be fixed in other places of buildings such as home, a store, an office, a factory and the like.

In the above illustrative embodiments, the control functions of the electronic device 1 are implemented in the software manner by the calculation processing of the CPU in accordance with the programs. However, some of the control functions may be implemented by an electrical hardware circuit.

A Japanese Patent Application No. 2014-071217 filed on Mar. 31, 2014 and configuring a part of the present application is herein incorporated for reference.

The invention claimed is:

1. An electronic device comprising:
   a main body having a fixing surface;
   a display unit having a display surface for displaying information;
   a first movement part connected to a lower end of the display unit and configured to linearly reciprocally move relative to the main body; and
   a convex part configured to be provided so that the convex part is protruded toward the display unit at a middle of the main body in a height direction,
   wherein the display unit can transition between an inclined state and a fixed state via an upper end contact state in accordance with the reciprocal movement of the first movement part,
   wherein in the inclined state, a movement of the display unit is fixed when the upper end of the display unit abuts the convex part, the display unit is spaced from the fixing surface, and the display surface faces upwards obliquely,
   wherein in the upper end contact state, an upper end of the display unit is in contact with the fixing surface and the lower end of the display unit is spaced from the fixing surface, and
   wherein in the fixed state, the upper end and the lower end of the display unit are in contact with the fixing surface, and the display unit is abutted to the convex part of the main body and a lower end of the main body.

2. The electronic device according to claim 1, further comprising:
   a second movement part configured to reciprocally move in parallel with the first movement part,
   a support part configured to support the display unit,
   a first connection part to which the lower end of the display unit is to be connected to be rotatable relative to the first movement part, and
   a second connection part provided between the upper end and the lower end of the display unit and to which the display unit and the support part are to be connected to be relatively rotatable,
   wherein in the upper end contact state, the first connection part is positioned more distant from the fixing surface than the second connection part.

3. The electronic device according to claim 2, further comprising a pressing part configured to press downwards the second movement part at least in the fixed state.

* * * * *